US012706073B2

(12) United States Patent
Yamamoto et al.

(10) Patent No.: US 12,706,073 B2
(45) Date of Patent: Aug. 11, 2026

(54) PEDAL UNIT AND ELECTRONIC KEYBOARD APPARATUS

(71) Applicant: YAMAHA CORPORATION, Hamamatsu (JP)

(72) Inventors: Shin Yamamoto, Hamamatsu (JP); Kenichi Nishida, Hamamatsu (JP); Ryosuke Nakamura, Hamamatsu (JP); Takahiro Mizuguchi, Hamamatsu (JP); Masaaki Mita, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 423 days.

(21) Appl. No.: 18/463,514

(22) Filed: Sep. 8, 2023

(65) Prior Publication Data

US 2023/0419924 A1 Dec. 28, 2023

Related U.S. Application Data

(63) Continuation of application No. PCT/JP2022/013203, filed on Mar. 22, 2022.

(30) Foreign Application Priority Data

Mar. 24, 2021 (JP) ................................ 2021-050480

(51) Int. Cl.
*G10C 3/26* (2019.01)

(52) U.S. Cl.
CPC .................................... *G10C 3/26* (2013.01)

(58) Field of Classification Search
CPC ... G10C 3/26; G05G 1/30; G05G 5/03; G10H 1/32
See application file for complete search history.

(56) References Cited

U.S. PATENT DOCUMENTS 6,461,243 B1 * 10/2002 Uehara ............ F16F 15/12326 192/205
2020/0111466 A1 * 4/2020 Goto .................... G10H 1/0008
2023/0335093 A1 * 10/2023 Ikemoto ................ G10H 1/348

FOREIGN PATENT DOCUMENTS

CN 116913228 A * 10/2023 ............ G10H 1/348
EP 4261816 A1 * 10/2023 .............. G05G 1/44
JP S4324856 Y1 10/1968

(Continued)

OTHER PUBLICATIONS

Office Action issued in Japanese Appln. No. 2023-509202 mailed Feb. 27, 2024. English translation provided.

(Continued)

*Primary Examiner* — Jeffrey Donels
(74) *Attorney, Agent, or Firm* — ROSSI, KIMMS & McDOWELL LLP

(57) ABSTRACT

A pedal unit according to an embodiment includes a first foot lever, a shaft serving as a center of rotation of the first foot lever, and a bearing paired with the shaft. The shaft or the bearing includes a first member arranged on at least a portion of surfaces in contact with each other, and a second member formed of a material different from the first member and supporting the first member from a side opposite the surfaces. The surfaces are included in an inner area of a width of the first foot lever when the first foot lever is viewed perpendicular to the shaft. The first member and the second member are fixed in a sliding direction of the shaft and the bearing.

24 Claims, 16 Drawing Sheets

(56) References Cited

FOREIGN PATENT DOCUMENTS

| | | | | |
|---|---|---|---|---|
| JP | S54118536 | U | | 8/1979 |
| JP | H0625897 | U | | 4/1994 |
| JP | 2001090781 | A | | 4/2001 |
| JP | 2004052845 | A | | 2/2004 |
| JP | 2009169818 | A | | 7/2009 |
| JP | 2013195655 | A | | 9/2013 |
| JP | 2013205495 | A | | 10/2013 |
| JP | 2017020626 | A | * | 1/2017 |
| JP | 2020056978 | A | | 4/2020 |

OTHER PUBLICATIONS

Office Action issued in Japanese Application No. 2023-509202 mailed Jul. 30, 2024. English machine translation provided.
International Search Report issued in Intl. Appln. No. PCT/JP2022/013203 mailed Jun. 21, 2022. English translation provided.
Written Opinion issued in Intl. Appln. No. PCT/JP2022/013203 mailed Jun. 21, 2022.
Office Action issued in Chinese Appln. No. 202280023815.4, mailed on Oct. 25, 2025.
Office Action issued in Japanese Appln. No. 2024-070243, mailed on Apr. 30, 2025. English machine translation provided.
English translation of Written Opinion issued in Intl. Appln. No. PCT/JP2022/013203, mailed Jun. 21, 2022, previously cited in an IDS on Sep. 8, 2023.

* cited by examiner

PEDAL UNIT AND ELECTRONIC KEYBOARD APPARATUS

CROSS-REFERENCE TO RELATED APPLICATIONS

This application is a Continuation of International Patent Application No. PCT/JP2022/013203, filed on Mar. 22, 2022, which claims the benefit of priority to Japanese Patent Application No. 2021-050480, filed on Mar. 24, 2021, the entire contents of which are incorporated herein by reference.

FIELD

The present disclosure relates to a pedal unit.

BACKGROUND

A pedal unit used in an electronic musical instrument detects a state in which a pedal is pressed (an end position) and a state in which a pedal is not pressed (a rest position), and transmits a detection result to a sound source device, thereby controlling a sound signal generated in the sound source device. Various techniques have been applied to such a pedal unit in order to obtain an operation feeling of a pedal of an acoustic piano. For example, Japanese laid-open patent publication No. 2013-205495 discloses a technique for applying hysteresis to a reaction force against a pedal pression. According to the technique disclosed in Japanese laid-open patent publication No. 2013-205495, a frictional force is generated when the pedal rotates. The frictional force is applied in the opposite direction to the pedal movement, while the elastic force that tends to return the pedal to the rest position is applied in a constant direction. As a result, the hysteresis characteristic of the reaction force is realized.

SUMMARY

A pedal unit according to an embodiment includes a first foot lever, a shaft serving as a center of rotation of the first foot lever, and a bearing paired with the shaft. The shaft or the bearing includes a first member arranged on at least a portion of surfaces in contact with each other, and a second member formed of a material different from the first member and supporting the first member from a side opposite to the surfaces. The surfaces are included in an inner area of a width of the first foot lever when the first foot lever is viewed perpendicular to the shaft. The first member and the second member are fixed in a sliding direction of the shaft and the bearing.

A force between the shaft and the bearing may increase when a force for rotating the first foot lever is applied to the first foot lever.

The pedal unit may include a second foot lever. A first distance from the center of rotation to a position where the shaft and the bearing contact each other in the first foot lever may be different from a second distance from the center of rotation to a position where the shaft and the bearing contact each other in the second foot lever.

The pedal unit may include a third foot lever. The first foot lever, the second foot lever, and the third foot lever may be arranged in order from the right side when the first foot lever is viewed from a side where the first foot lever is lowered when the first foot lever is rotated. A third distance from the center of rotation to a position where the shaft and the bearing contact each other in the third foot lever may be greater than either the first distance or the second distance.

The shaft and the bearing may be in contact at least in a first area and a second area. The first area may be arranged apart from the second area. There may be a portion where the shaft and the bearing are separated from each other between the first area and the second area.

A first position between the first area and the second area and separated from both the first area and the second area, a second position between the first position and the first area, and a third position between the first position and the second area are defined. In this case, a first separation distance from the shaft to the bearing in the first position may be shorter than a second separation distance from the shaft to the bearing in the second position and a third separation distance from the shaft to the bearing in the third position.

The shaft may have an interlocking portion in an outer area of a width of the first foot lever when the first foot lever is viewed perpendicular to the shaft. The bearing may include a third member sliding with the shaft in the outer area when the first foot lever is rotated.

In addition, a pedal unit according to an embodiment includes a first foot lever, a shaft serving as a center of rotation of the first foot lever, and a bearing paired with the shaft. The shaft has an interlocking portion in an outer area of a width of the first foot lever when the first foot lever is viewed perpendicular to the shaft. The bearing includes a third member sliding with the shaft in the outer area when the first foot lever is rotated.

In addition, a pedal unit according to an embodiment includes a first foot lever, a shaft serving as a center of rotation of the first foot lever, and a bearing paired with the shaft. A first distance from the center of rotation to a position where the shaft and the bearing contact each other is 4 mm or more.

The bearing may include a first bearing and a second bearing. The shaft may be sandwiched between the first bearing and the second bearing in a state where the first bearing and the second bearing are subjected to a force in a direction approaching each other.

The shaft may be in contact with the first bearing at least in a first area and in a second area. The first area may be arranged apart from the second area. There may be a portion where the shaft and the first bearing are separated from each other between the first area and the second area. The shaft may be in contact with the second bearing at least in a third area and a fourth area. The third area may be arranged apart from the fourth area. There may be a portion wherein the shaft and the second bearing are separated from each other between the third area and the fourth area.

In addition, a pedal unit according to an embodiment includes a case, a first foot lever arranged rotationally with respect to the case and extending in a first direction perpendicular to a rotation axis, a spring arranged in a compressed state between the case and the first foot lever, and expanding and contracting with the rotation of the first foot lever, a first support member supporting a first end of the spring, and a second support member supporting a second end of the spring. A first cross-section including a radial direction of the spring at a position supported by the first support member is defined. A first center position corresponding to the center of the spring in the first cross-section is defined. A first axial direction perpendicular to the first cross-section and facing to the inner side of the spring from the first center position is defined. A second cross-section including a radial direction of the spring at a position supported by the second support member is defined. A second center position corresponding to the center of the spring in the second cross-section is defined. A centerline connecting the first center position and the second center position is defined. An angle formed by the first axial direction and the centerline is defined as a first angle. The first angle becomes smaller when the first foot lever moves from a state where the spring is most extended to a direction in which the spring contracts within a range of rotation of the first foot lever.

The first angle may become smaller when the first foot lever moves in the direction in which the spring contracts within the entire range of rotation of the first foot lever.

The first angle may be 0 degrees at any position within a range of rotation of the first foot lever. The first angle may be 10 degrees or less in a state where the spring is most contracted within a range of rotation of the first foot lever.

An angle formed by a line connecting the rotation axis and the first center position and the first axial direction may be less than 90 degrees.

A second axial direction perpendicular to the second cross-section and facing the inner side of the spring from the second center position is defined. An angle formed by the second axial direction and the centerline is defined as a second angle. The first angle may be greater than the second angle in a state where the spring is most extended within a range of rotation of the first foot lever.

The second angle may be 0 degrees at any position within a range of rotation of the first foot lever. The second angle may be 10 degrees or less in a state where the spring is most contracted within a range of rotation of the first foot lever.

The first angle may be 0 degrees at a first position within a range of rotation of the first foot lever. The second angle may be 0 degrees at a second position different from the first position within a range of rotation of the first foot lever.

Both the first angle and the second angle may be greater than 0 degrees throughout the entire range of rotation of the first foot lever.

An angle formed by a line connecting the rotation axis and the second center position and the second axial direction may be less than 90 degrees.

In addition, a pedal unit according to an embodiment includes a case, a first foot lever arranged rotationally with respect to the case and extending in a first direction perpendicular to a rotation axis, a spring arranged in a compressed state between the case and the first foot lever, and expanding and contracting with the rotation of the first foot lever, a first support member supporting a first end of the spring, and a second support member supporting a second end of the spring. The spring includes a first winding end present on the first end side and a second winding end present on the second end side. A side surface of the first winding end is in contact with a side surface of a first portion of a winding constituting the spring. A side surface of the second winding end is in contact with a side surface of the second portion of the winding. The first support member has a portion in contact with the winding at any position between the first winding end and the first portion from an inner or outer circumferential side of the spring and is separated from a winding of the first portion. The second support member has a portion in contact with the winding at any position between the second winding end and the second portion from the inner or outer circumferential side of the spring and is separated from a winding of the second portion.

In addition, a pedal unit according to an embodiment includes a case, a first foot lever arranged rotationally with respect to the case and extending in a first direction perpendicular to a rotation axis, a spring arranged in a compressed state between the case and the first foot lever, and expanding and contracting with the rotation of the first foot lever, a first support member supporting a first end of the spring, and a second support member supporting a second end of the spring. The spring includes a first winding end present on the first end side and a second winding end present on the second end side. A side surface of the first winding end is in contact with a side surface of a first portion of a winding constituting the spring. A side surface of the second winding end is in contact with a side surface of the second portion of the winding. The first support member has a portion contacting the first portion from the inside or outside of the spring in at least a portion of a range of rotation of the first foot lever. The second support member has a portion contacting the second portion from the inside or outside of the spring in at least a portion of a range of rotation of the first foot lever.

In addition, an electronic keyboard device according to an embodiment includes the pedal unit described above, a keyboard unit including a plurality of keys, and a sound source unit generating a sound signal in response to an operation on the keys and an operation on the first foot lever in the pedal unit.

DESCRIPTION OF EMBODIMENTS

Figure 1:
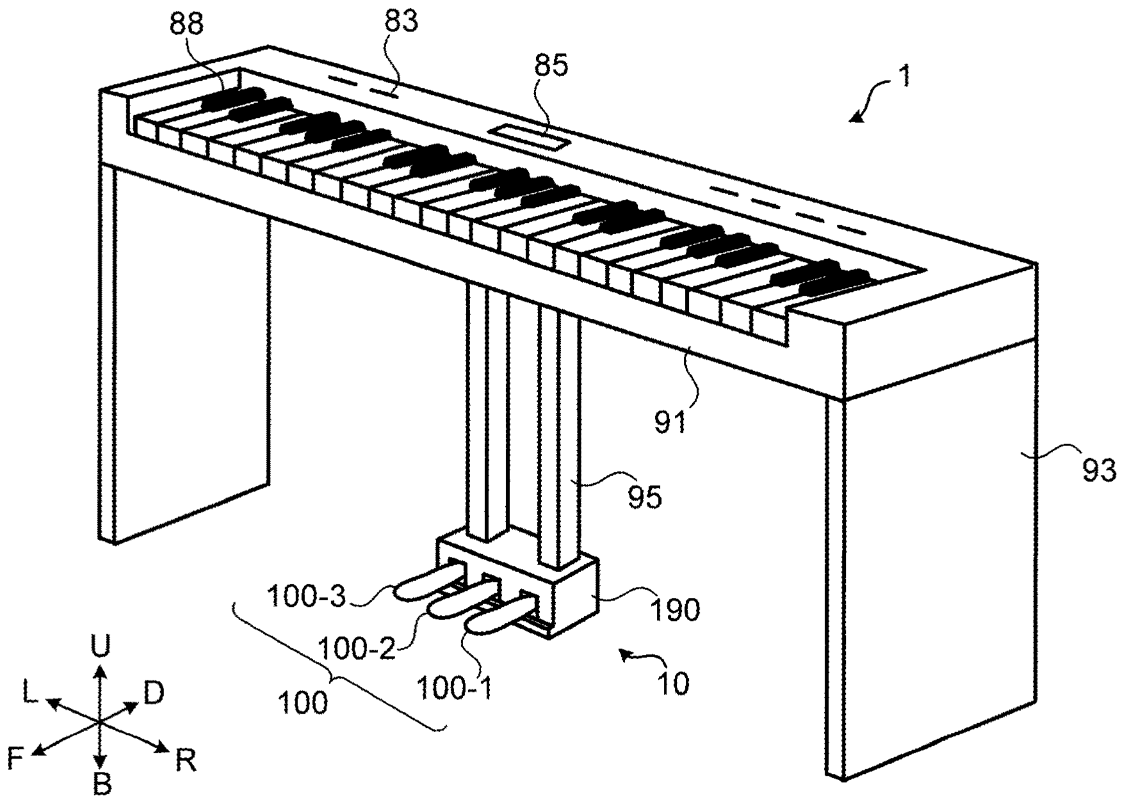
FIG. 1 is a diagram showing an external view of an electronic keyboard apparatus according to an embodiment.

Hereinafter, an embodiment of the present disclosure will be described in detail with reference to the drawings. The following embodiments are examples, and the present disclosure should not be construed as being limited to these embodiments. In the drawings referred to in the present exemplary embodiments, the same portions or portions having similar functions are denoted by the same symbols or similar symbols (symbols each formed simply by adding A, B, etc. to the end of a number), and a repetitive description thereof may be omitted. In the drawings, dimensional ratios may be different from actual ratios, or part of a configuration may be omitted from the drawings for clarity of explanation.

Since the hysteresis characteristic of a reaction force generated in a pedal of an acoustic piano is complicated, there is considerable difficulty in realizing this. According to the above-described technique, the hysteresis characteristic is realized by a configuration in which the frictional force is constant regardless of a pression position of the pedal, or by changing the magnitude of the frictional force step by step. However, it is insufficient to control the frictional force step by step as a configuration for obtaining an operation feeling equivalent to the pedal of the acoustic piano. Therefore, it is desired to develop a pedal unit that can be brought close to the operation feeling equivalent to the pedal of the acoustic piano.

One of the objects of the present disclosure is to bring the operation feeling of the pedal of the pedal unit closer to the operation feeling of the pedal of the acoustic piano.

According to the present disclosure, it is possible to bring an operation feeling of a pedal of a pedal unit close to an operation feeling of a pedal of an acoustic piano.

First Embodiment

[1. Electronic Keyboard Apparatus]

FIG. 1 is a diagram showing an external view of an electronic keyboard apparatus according to an embodiment. An electronic keyboard apparatus 1 includes a pedal unit 10, a keyboard body 91, a support plate 93 for supporting the keyboard body 91 at a predetermined height, and a support column 95 for suspending and supporting the pedal unit 10 from the keyboard body 91. The pedal unit 10 may be separable from the keyboard body 91. In this case, the pedal unit 10 and the support column 95 may be separated from each other, or the support column 95 and the keyboard body 91 may be separated from each other.

The keyboard body 91 includes an operation unit 83, a display unit 85, and a keyboard unit 88 composed of a plurality of keys. The pedal unit 10 includes a case 190 and at least one foot lever 100 protruding from the case 190. In this example, the pedal unit 10 includes three foot levers 100-1, 100-2, and 100-3 (first, second, and third foot levers). In terms of function, the foot lever 100-1 corresponds to a damper pedal, the foot lever 100-2 corresponds to a sostenuto pedal, and the foot lever 100-3 corresponds to a shift pedal. In the following description, the three foot levers 100-1, 100-2, and 100-3 are shown as the foot lever 100 unless they are separately described. The foot lever 100 may also be referred to as a pedal arm.

As shown in FIG. 1, a front direction F, a depth direction D, an upper direction U, a bottom direction B, a left direction L, and a right direction R are defined with reference to a user (a player) who plays the electronic keyboard apparatus 1. In other words, the front direction F and the depth direction D are along a longitudinal direction of the key. The longitudinal direction of the key may be referred to as a front-rear direction. The left direction L and the right direction R are along the array direction of the keys. The key array direction may be referred to as a left-right direction. The right direction R corresponds to a treble side of the key. A plane including the front-rear direction and the left-right direction may be referred to as a horizontal plane. The upper direction U and the bottom direction B are along a vertical direction. The vertical direction may be referred to as an up-down direction. The horizontal plane is used as a reference for the height. For example, the case where a first configuration is higher than a second configuration includes the case where the first configuration is not only present in an area in the upper direction U of the second configuration (an area directly above the second configuration), but also the case where the first configuration is present in an area shifted from the area in the left-right direction or the front-rear direction. The same definitions are applied to the description of the following figures.

According to the pedal unit 10 of an embodiment, adopting a structure different from the conventional structure for its inner structure makes it possible to bring an operation feeling of the pedal closer to an operation feeling of a pedal of an acoustic piano. Hereinafter, each configuration of the electronic keyboard apparatus 1 will be described, and in particular, the pedal unit 10 will be described in detail.

Figure 2:
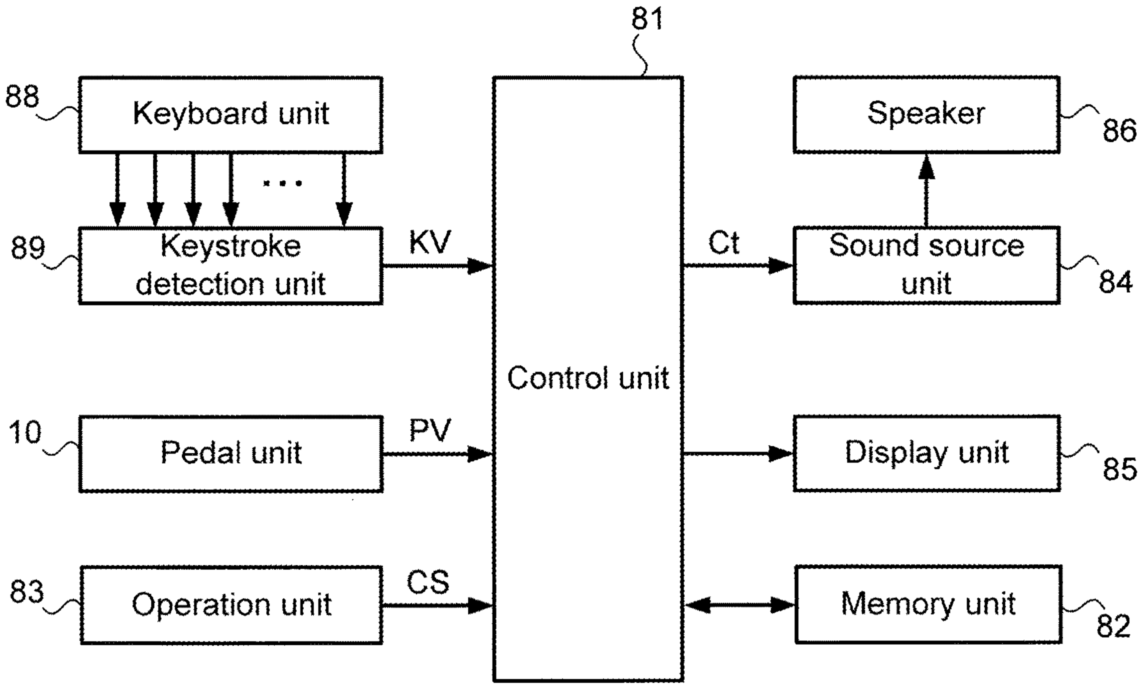
FIG. 2 is a diagram showing a configuration of an electronic keyboard apparatus according to an embodiment.

FIG. 2 is a diagram showing a configuration of an electronic keyboard apparatus according to an embodiment. The electronic keyboard apparatus 1 includes the pedal unit 10, a control unit 81, a memory unit 82, the operation unit 83, a sound source unit 84, the display unit 85, a speaker 86, the keyboard unit 88, and a key press detecting unit 89.

The key press detecting unit 89 detects a pressing operation to a key included in the keyboard unit 88, and outputs a key signal KV corresponding to a detection result to the control unit 81. The key signal KV includes information corresponding to a key to be operated and an operation amount of the key. The pedal unit 10 detects the pressing operation to the foot lever 100 and outputs a pedal signal PV corresponding to a detection result to the control unit 81. The pedal signal PV includes information corresponding to a pedal to be operated and an operation amount of the pedal.

The operation unit 83 includes operating devices such as a knob, a slider, a contact sensor, and a button, and receives an instruction from the user to the electronic keyboard apparatus 1. The operation unit 83 outputs an operation signal CS corresponding to the received instruction from the user to the control unit 81.

The memory unit 82 is a memory device such as a non-volatile memory, and includes an area for storing a control program executed by the control unit 81. The control program may be provided from an external device. Various functions are realized in the electronic keyboard apparatus 1 when the control program is executed by the control unit 81.

The control unit 81 is an example of a computer including a calculation processing circuit, such as a CPU, and a memory device such as a RAM and ROM. The control unit 81 executes a control program stored in the memory unit 82 by the CPU, and implements various functions in the electronic keyboard apparatus 1 according to instructions described in the control program. For example, the control unit 81 generates a sound source control signal Ct based on the key signal KV, the pedal signal PV, and the operation signal CS.

The sound source unit 84 includes a DSP (Digital Signal Processor). The sound source unit 84 generates a sound signal based on the sound source control signal Ct supplied from the control unit 81. In other words, the sound source unit 84 generates a sound signal according to an operation to the key of the keyboard unit 88 and an operation to the foot lever 100 of the pedal unit 10. The sound source unit 84 may supply the generated sound signal to the speaker 86. The speaker 86 generates a sound corresponding to the sound signal by amplifying and outputting the sound signal supplied from the sound source unit 84. The display unit 85 includes a display device such as a liquid crystal display and displays various screens under the control of the control unit 81. A touch panel may be configured by combining a touch sensor with the display unit 85.

[2. Configuration of Pedal Unit]

Next, a configuration of the pedal unit 10 will be described. In the following description, a description will be given focusing on one foot lever 100.

Figure 3:
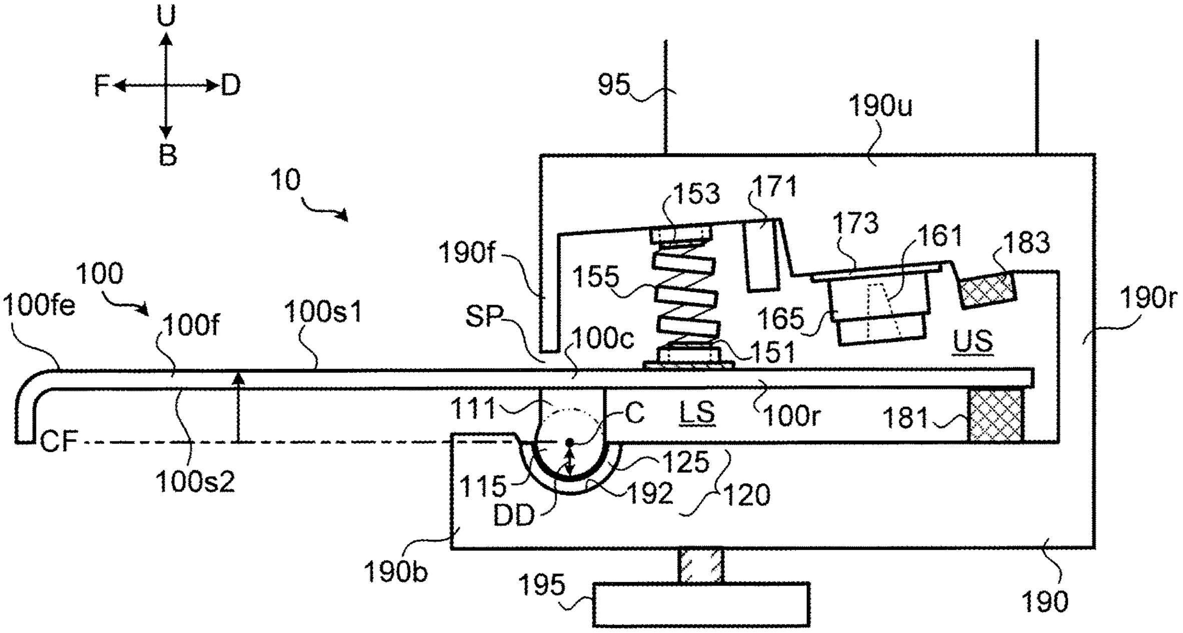
FIG. 3 is a diagram showing a configuration of a pedal unit according to a first embodiment.

FIG. 3 is a diagram showing a configuration of a pedal unit according to the first embodiment. FIG. 3 shows a state in which the foot lever 100 is not pressed, that is, a state in which the foot lever 100 is present in a rest position. The pedal unit 10 includes the case 190 that houses the foot lever 100 and part of the foot lever 100. In this example, the pedal unit 10 includes an auxiliary tool 195 for assisting in fixing a position of the case 190 with respect to a floor on a bottom surface of a bottom portion **190*b***.

For example, although the case 190 is formed of an FRP (fiber-reinforced resin), the case 190 may be formed of other resins such as a PBT resin, an ABS resin, a POM resin, a PPS resin, a PEEK resin, and may also be formed of a metal. The case 190 includes the bottom portion **190*b*, a ceiling portion 190*u*, and a side portion. The side portion is a wall portion connecting the bottom portion 190*b* and the ceiling portion 190*u*. The ceiling portion 190*u* and the bottom portion 190*b* are configured to be separable from each other, and are fixed to each other by screws or the like via the side portion. In this example, although the side portion and the ceiling portion 190*u* are integrally formed, the side portion and the bottom portion 190*b* may be integrally formed. In FIG. 3, a front portion 190*f* and a rear portion 190*r* of the side portion are shown. The portions of the side portion arranged in the left direction L and the right direction R are not shown. There is an opening between the front portion 190*f* and the bottom portion 190*b*. The foot lever 100 is arranged such that part of the foot lever 100 is inside the case 190 and the remaining portion is outside the case 190. The foot lever 100 is rotatably arranged with respect to the case 190 by a shaft 115 and a bearing 120, which will be described below. A center of rotation C is located inside the case 190. The opening has a size such that it does not interfere within a range of rotation of the foot lever 100**.

The foot lever 100 is formed of a metal and has its longitudinal side in the front-rear direction. In the following explanation, an area of the foot lever 100 in the depth direction D with respect to the center of rotation C is referred to as a first area **100*r*, and an area in the front direction F with respect to the center of rotation C and outside the case 190 is referred to as a second area 100*f*. A surface of the foot lever 100 in the upper direction U is referred to as an upper surface 100*s*1, and a surface in the bottom direction B is referred to as a bottom surface 100*s*2. The upper surface 100*s*1 and the bottom surface 100*s*2 do not include a portion bent in the bottom direction B at a tip portion of the second area 100*f* of the foot lever 100**.

In this example, the upper surface **100*s*1 includes a horizontal plane when the foot lever 100 is in the rest position. Since the second area 100*f* is tilted so as to be relatively higher or lower with respect to the first area 100*r*, the upper surface 100*s*1 may not include the horizontal plane. For example, the upper surface 100*s*1 may include a substantially horizontal plane. In this example, the substantially horizontal plane is a concept that includes up to a 5-degree tilt with respect to the horizontal plane. If the foot lever 100 is in the rest position and does not include the horizontal plane, a state in which the upper surface 100*s*1 includes the horizontal plane may be realized in the range of rotation, or a state in which the upper surface 100*s*1** includes the horizontal plane may not be realized at any position within the range of rotation.

An area (hereinafter referred to as a central area **100*c*) located substantially at the center of the foot lever 100 in the longitudinal direction is connected to the shaft support portion 111 on the bottom surface 100*s*2. The shaft 115 is connected to a tip of the shaft support portion 111. That is, the shaft support portion 111 connects the shaft 115 and the foot lever 100 and supports the shaft 115 with respect to the foot lever 100**.

The shaft 115 forms a rotation axis extending along the left-right direction, and has an arc shape at an edge portion of a cross-section perpendicular to the rotation axis. The arc shape corresponds to part of a circle centered on the center of rotation C. The shaft 115 is formed of a resin different from the resin of the case 190. For example, the shaft 115 is formed of a POM resin, but may be formed of other resins such as a PBT resin, an ABS resin, a nylon resin, a PTFE resin, a UHPE resin, and a PEEK resin, or the like. The bearing 120 paired with the shaft 115 includes a contact portion 125 (first member) and a bearing support portion 192. The contact portion 125 contacts a portion on which the shaft 115 is placed and corresponds to the arc shape in the shaft 115. A surface where the contact portion 125 contacts the shaft 115 is referred to as a contact surface. Therefore, the shaft 115 and the contact portion 125 slide when the foot lever 100 rotates. The bearing support portion 192 supports the contact portion 125 from the side opposite to the contact surface. In this example, although the bearing support portion 192 (second member) corresponds to part of the case 190, the bearing support portion 192 may be formed of a member different from the case 190. Therefore, the contact portion 125 is sandwiched between the shaft 115 and the bearing support portion 192. The bearing support portion 192 may also be referred to as a surface that supports the contact portion 125 (hereinafter, sometimes referred to as a support surface). In this case, at least parts of the contact surface and the support surface face each other.

In this example, the contact surface and the support surface differ from each other only in distances from the center of rotation C and have a similar relationship, but may not have such a relationship. The contact surface has a shape in which the distance from the center of rotation C is equal at any position. This distance may be referred to as a radius of curvature DD in the following explanation, and corresponds to the radius of the shaft 115. The radius of curvature DD may be appropriately set to, for example, preferably 3.5 mm or more, and more preferably 4.0 mm or more. On the other hand, the support surface may have a shape in which the distance from the center of rotation C is different depending on the position, and may be a shape in which the contact portion 125 is supported by the bearing support portion 192. Although a positional relationship between the bearing support portion 192 and the contact portion 125 is fixed, it is sufficient that the positional relationship is fixed in at least a direction where the bearing support portion 192 and the contact portion 125 slide each other. That is, it is sufficient that the contact portion 125 is fixed so as not to rotate with respect to the bearing support portion 192 when the shaft 115 rotates with respect to the bearing 120.

The contact portion 125 is formed of a resin different from the resins of the shaft 115 and the bearing support portion 192 (the case 190). For example, the contact portion 125 is formed of a PBT resin, but may also be formed of other resins such as a POM resin, an ABS resin, a nylon resin, a PTFE resin, an UHPE resin, and a PEEK resin, or the like. A relationship between the resin material of the contact portion 125 and the resin material of the shaft 115 is determined so as to obtain a desired frictional force between the contact portion 125 and the shaft 115 and reduce wear.

Figure 4:
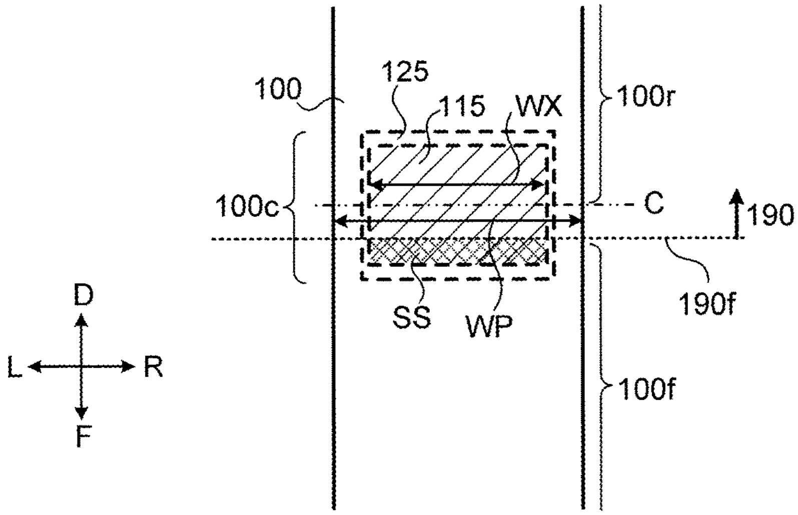
FIG. 4 is a diagram showing a positional relationship between a foot lever and an axis.

FIG. 4 is a diagram showing a positional relationship between a foot lever and a shaft. FIG. 4 corresponds to a situation in which the foot lever 100 is viewed in a direction (in this case, the bottom direction B) perpendicular to the center of rotation C (rotation axis). According to this drawing, a width WP of part of the foot lever 100 located directly above the rotation axis is wider than a width WX of an area (contact surface) in which the shaft 115 and the contact part 125 face and contact each other. These widths are lengths in the left-right direction (lengths along the rotation axis). The shaft 115 is arranged inside the foot lever 100 as described above, so that the shaft 115 cannot be seen when the foot lever 100 is viewed from the upper surface **100*s*1. In this example, the center of rotation C is located inside the case 190**.

In this example, as shown in FIG. 4, at least part of the contact surface overlaps the second area **100*f* (area displayed by mesh). Such an overlapping area may not be present. The center of rotation C may be located outside the case 190, but is preferably located inside the case 190**.

The description will be continued by returning to FIG. 3. An elastic member 155, a reaction force adding member 165, a stroke sensor 171, a contact sensor 173, a lower stopper 181, and an upper stopper 183 are arranged in an inner space of the case 190.

In this example, the elastic member 155 may be a spring formed of a metal, but may not be formed of a metal, and may not be spring-shaped. That is, the elastic member 155 may be any member that generates an elastic force by elastic deformation. The elastic member 155 is arranged in an upper space US formed at a position higher than the first area **100*r* in the inner space of the case 190. The upper end portion of the elastic member 155 is supported by a support member 153 fixed to the ceiling portion 190*u*. A lower end portion of the elastic member 155 is supported by a support member 151 fixed to the upper surface 100*s*1 in the first area 100*r*. The axial direction of the spring forming the elastic member 155 preferably coincides with the direction of rotation (circumferential direction) at the portion in contact with the first area 100*r* at any position of the range of rotation of the foot lever 100 (e.g., the end position, the rest position, or the position at which the reaction force adding member 165 and the foot lever 100 contact each other (see FIG. 5**)).

The elastic member 155 is supported by the support members 151 and 153 in a state of being compressed more than its natural length and applies a force to the first area **100*r* to hold the foot lever 100 in the rest position. The force applied to the first area 100*r* includes a component in the bottom direction B. The elastic member 155 presses the first area 100*r* against the lower stopper 181 and presses the shaft 115 against the contact portion 125 by the elastic force. The second area 100*f* operated by the user is an area relatively close to the center of rotation C. Even if the elastic force of the elastic member 155 is reduced, a large reaction force can be applied to the second area 100*f* due to a relationship of a lever ratio. Therefore, a strength of the case 190 required to support the elastic member 155 may be small, and the degree of freedom in the material and a shape of the case 190** is improved.

The lower stopper 181 is arranged on the bottom portion **190*b* and contacts the bottom surface 100*s*2 of the first area 100*r* in the foot lever 100. The lower stopper 181 contacts part of the first area 100*r* that is located in the depth direction D with respect to the elastic member 155 (in this example, an end portion of the foot lever 100 in the first area 100*r* side). In other words, the portion of the foot lever 100 to which the force is applied by the elastic member 155 is present between the shaft 115 and the lower stopper 181. In this state, the rest position of the foot lever 100 is defined. The more the position of the lower stopper 181 is away from the center of rotation C, the higher the positioning accuracy can be. The foot lever 100 is stably supported in the pedal unit 10 by applying force to the first area 100*r* by the elastic member 155** by such a positional relationship.

The upper stopper 183 is arranged on the ceiling portion **190*u* and contacts the upper surface 100*s*1 of the first area 100*r* in the foot lever 100. In this example, the upper stopper 183 contacts the end portion of the first area 100*r* in the foot lever 100. In this state, the end position of the foot lever 100 is defined (corresponding to FIG. 6). The more the position of the upper stopper 183 is away from the center of rotation C, the higher the positioning accuracy can be. As a result, the foot lever 100** can rotate between the rest position and the end position (that is, the range of rotation).

The stroke sensor 171 is arranged on the ceiling portion **190*u* and is a sensor for detecting the behavior (for example, amount of rotation) of the foot lever 100. In this example, the stroke sensor 171 includes an optical sensor for measuring a position of the first area 100*r* (a displacement from the reference position). The optical sensor in the stroke sensor 171 is a passive element that changes an electric signal by changing a position of a detection target. In this example, the optical sensor serving as the passive element is arranged in the upper direction U of the first area 100***r* but may be arranged to be shifted in the left-right direction with respect to the first area 100*r*. That is, the optical sensor may be arranged at a position higher than the first area 100*r* instead of being arranged directly above the first area 100*r*. In other words, the optical sensor may be arranged in the upper space US. The stroke sensor 171 may be a sensor that detects the position of the foot lever 100 in the first area 100*r* corresponding to the rest position and the end position in the range of rotation, or may be a sensor that detects the position of the first area 100*r* in a predetermined area in the vicinity of the position where the first area 100*r* contacts the reaction force adding member 165. The amount of rotation of the foot lever 100 (the amount the foot lever 100 is pressed) can be calculated based on the detection result of the stroke sensor 171. Information corresponding to the calculated amount of rotation is included in the above-described pedal signal PV.

The contact sensor 173 is arranged on the ceiling portion 190*u* and detects the contact with a predetermined detecting position. In this example, the reaction force adding member 165 is a dome-shaped member formed of an elastic member such as rubber and forms a space therein. The reaction force adding member 165 includes a protruding portion 161 protruding toward the inner space. The reaction force adding member 165 is arranged so as to cover the detecting position by the contact sensor 173 from below in the upper space US. The reaction force adding member 165 deforms when a force is applied from below. The contact sensor 173 outputs a predetermined detection signal when the protruding portion 161 contacts the detection position by the contact sensor 173 due to the deformation. This detection signal is also included in the pedal signal PV. The reaction force adding member 165 may have a spring shape as the elastic member 155 and may be configured to be elastically deformable. The detection by the contact sensor 173 may be performed in a process of elastic deformation of the reaction force adding member 165.

[3. Operation of Pedal Unit]

Next, an operation in which the foot lever 100 rotates from the rest position to the end position will be described. When the foot lever 100 is pressed and rotated, the second area 100*f*, which is a portion to be pressed, is lowered, and the first area 100*r* is raised. In this case, the elastic member 155 is gradually compressed to increase the elastic force, thereby increasing the force (reaction force) required to lower the second area 100*f*. In this case, a frictional force is generated by sliding of the shaft 115 and the contact portion 125. The frictional force and the elastic force are perceived by the user as a reaction force when the foot lever 100 is pressed.

As the force of the user pressing the foot lever 100 is increased to resist an increase of the reaction force, the elastic member 155 becomes a fulcrum, and thus the force (normal force) applied from the shaft 115 to the contact portion 125 is increased. As a result, the frictional force generated between the shaft 115 and the contact portion 125 also increases, and the reaction force further increases.

Figure 5:
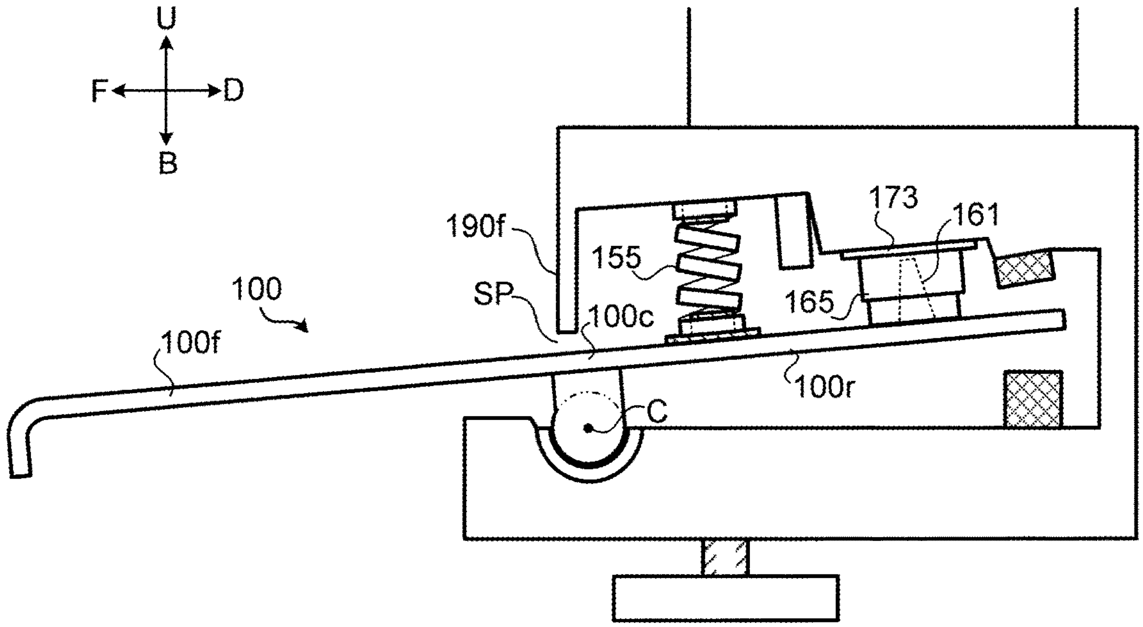
FIG. 5 is a diagram showing a pedal unit when a foot lever is rotated to just before a half-pedal state.

FIG. 5 is a diagram showing the pedal unit when the foot lever is rotated until just before a half-pedal state. As shown in FIG. 5, when the foot lever 100 is further pressed and rotated, the first area 100*r* contacts the reaction force adding member 165 in a state where the foot lever is being moved from the rest position toward the end position. In this case, the upper surface 100*s*1 of the first area 100*r* and the reaction force adding member 165 are preferably in surface contact.

When the second area 100*f* is further lowered from this state, the reaction force adding member 165 begins to deform due to the first area 100*r*. This increases a degree of increase in the reaction force due to the elastic force of the reaction force adding member 165 in addition to the elastic force of the elastic member 155. The user perceives the change in the reaction force and further presses the foot lever 100 so that the user can perceive that the foot lever has approached the half-pedal state. When the second area 100*f* is further lowered, the contact sensor 173 detects that the protruding portion 161 has contacted the sensing position. For example, the pedal signal PV including the detection signal obtained in response to the detection is transmitted to the control unit 81, and the sound source unit 84 can be controlled so as to give a half-pedal effect to the sound signal.

Figure 6:
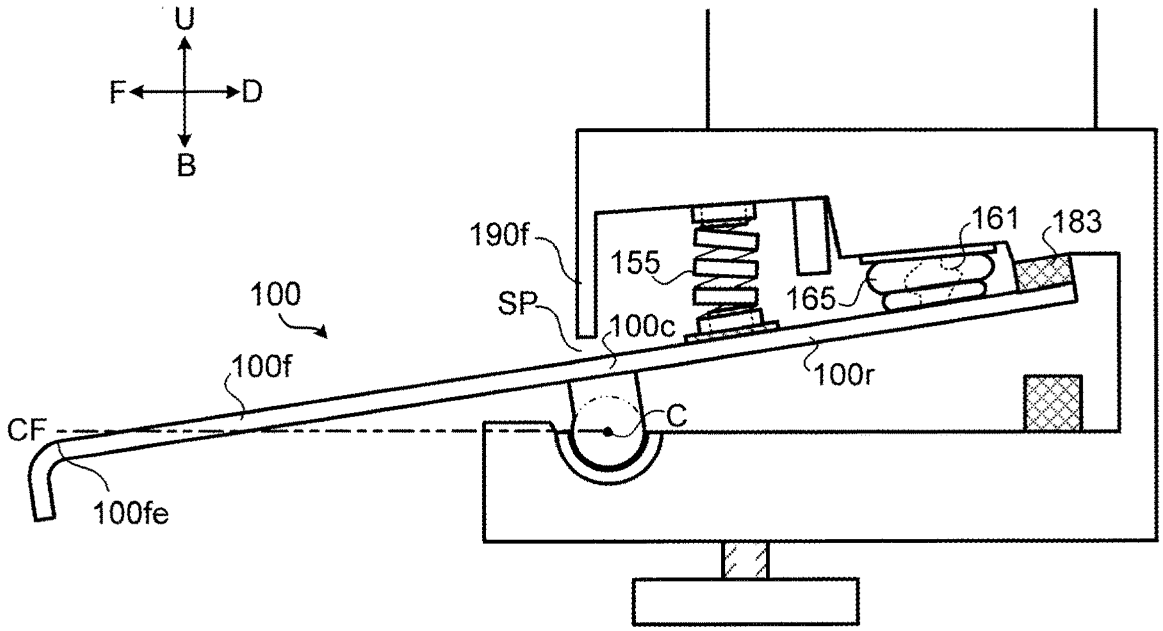
FIG. 6 is a diagram showing a pedal unit when a foot lever is rotated to an end position.

FIG. 6 is a diagram showing the pedal unit when the foot lever is rotated to the end position. When the second area 100*f* is further lowered from the half-pedal state, the deformation of the reaction force adding member 165 is further increased, and the protruding portion 161 also begins to be deformed. As shown in FIG. 6, the foot lever 100 reaches the end position by contacting the first area 100*r* with the upper stopper 183.

As shown in FIG. 3, FIG. 5, and FIG. 6, since the central area 100*c* of the foot lever 100 is in the vicinity of the center of rotation C, a size of a separation part SP between the central area 100*c* and the front portion 190*f* does not significantly change even when the foot lever 100 rotates. Therefore, the separation part SP can be made small, the pinching of the finger or the like can be prevented, and the inner structure of the case 190 can be made difficult to see from the outside. It is more effective to make the thickness of the front portion 190*f* (length in the front-rear direction) thinner than the distance from the center of rotation C to the contact surface (radius of curvature DD).

As shown in FIG. 3, in the rest position, the upper surface 100*s*1 of the foot lever 100 (at least an upper distal end portion 100*fe* in the front direction F in the upper surface 100*s*1) is located at a position higher than the horizontal plane including the center of rotation C (hereinafter, referred to as an axis horizontal plane CF). On the other hand, as shown in FIG. 6, at least part of the upper surface 100*s*1 in the foot lever 100 is located at a position lower than the axis horizontal plane CF at the end position. In this example, the upper distal end portion 100*fe* of the upper surface 100*s*1 in the second area 100*f* is located at a position lower than the axis horizontal plane CF.

The foot lever 100 according to an embodiment has a shorter distance from the center of rotation C to the upper distal end portion 100*fe*. The shorter the distance, the greater the amount of movement of the upper distal end portion 100*fe* in the front-rear direction when the foot lever 100 is pressed. Setting the positional relationship between the upper distal end portion 100*fe* and the axis horizontal plane CF as described above makes it possible to reduce the amount of movement of the upper distal end portion 100*fe* in the front-rear direction due to the rotation of the foot lever 100. The positional relationship between the upper distal end portion 100*fe* and the axis horizontal plane CF is not limited to this example. For example, the upper distal end portion 100*fe* may be located at a position lower than the axis horizontal plane CF in the rest position, or may be located at a position higher than the axis horizontal plane CF in the end position.

In the pedal unit 10 used in the electronic keyboard apparatus 1, the first area 100*r* and the second area 100*f* are arranged with the center of rotation C interposed therebetween, and the rotation of the foot lever 100 is realized by a seesaw type rotation. As a result, it is possible to make the upper space US above the upper surface 100*s*1 side in the upper space area 100*r* bigger and to make a lower space LS above the bottom surface 100*s*2 side in the first space LS smaller. The pedal unit 10 is arranged at a position close to an installation surface of the electronic keyboard apparatus 1. Therefore, the flexibility of design is improved by making the area (the lower space LS) lower than the foot lever 100 as small as possible.

As described above, the user operates the foot lever 100 to press to the end position, so that the elastic member 155 becomes a fulcrum, and the force (normal force) applied from the shaft 115 to the contact portion 125 is increased. As a result, the frictional force generated between the shaft 115 and the contact portion 125 also increases, and the reaction force further increases. In this case, the force of the elastic force by the elastic member 155 and the frictional force is perceived by the user as a reaction force. As the amount of pressing of the foot lever 100 increases, the frictional force increases. Therefore, as the amount of pressing of the foot lever 100 increases, the reaction force perceived by the user increases.

On the other hand, when the user operates the foot lever 100 to return to the rest position, a frictional force is generated in a direction opposite to the elastic force. Therefore, the reaction force perceived by the user when the foot lever 100 is returned to the rest position is smaller than when the foot lever is pressed to the end position. As described above, the closer the position of the foot lever 100 to the end position, the greater the frictional force. Therefore, in the case of switching between the state of pressing to the end position and the state of returning to the rest position, the hysteresis characteristic has a characteristic in which the reaction force greatly changes due to a change in the direction in which the frictional force acts as the switching is performed at a position where the influence of the frictional force increases (a position close to the end position). For example, in the case where the position at the foot lever 100 is pressed from the rest position and then returned to the rest position is a position after the half-pedal state, the amount of decrease in the reaction force is larger than in the case where the position is a position before the half-pedal state. As described above, according to the pedal unit 10 of an embodiment, it is possible to realize an operation feeling close to that of a pedal of an acoustic piano depending on a situation in which the frictional force changes due to the rotation position of the foot lever 100.

Second Embodiment

In the first embodiment, the shaft 115 is fixed to the foot lever 100, and the bearing 120 is fixed to the case 190. The relationship between the shaft and the bearing may be reversed. In a second embodiment, an example in which the relationship between the shaft and the bearing in the first embodiment is reversed will be described.

Figure 7:
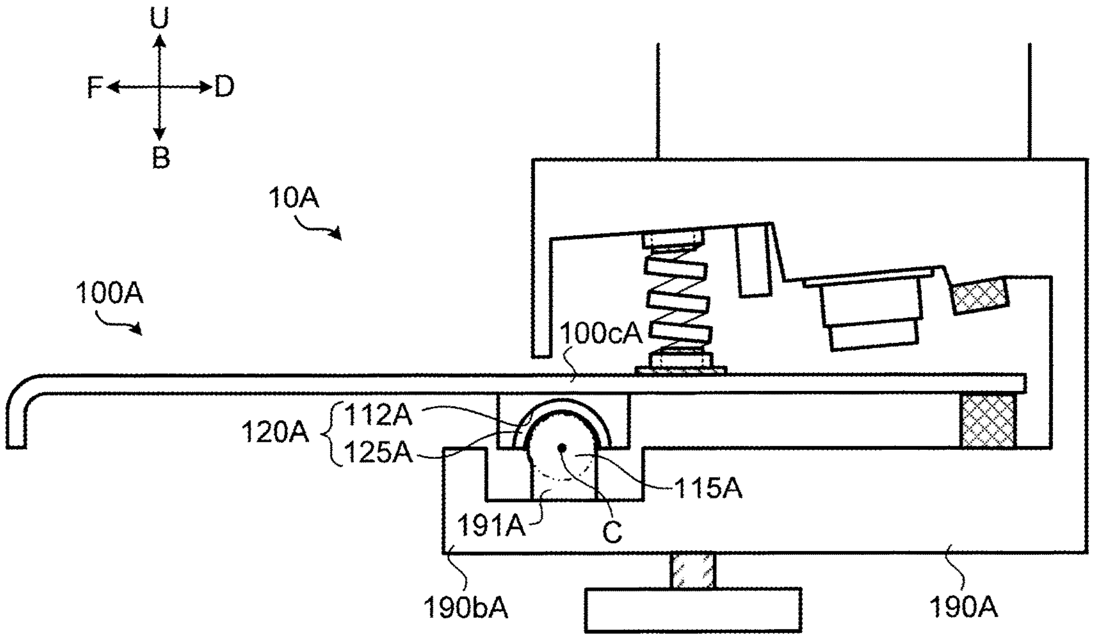
FIG. 7 is a diagram showing a configuration of a pedal unit according to a second embodiment.

FIG. 7 is a diagram showing a configuration of a pedal unit according to the second embodiment. In a pedal unit 10A according to the second embodiment, a bearing 120A is fixed to a foot lever 100A, and a shaft 115A is fixed to a case 190A. The shaft 115A is supported by a shaft support portion 191A protruding upward with respect to a bottom portion 190*b*A. The bearing 120A includes a contact portion 125A and a bearing support portion 112A that supports the contact portion 125A from opposing the contact surface. The bearing support portion 112A is connected to a central area 100*c*A. Part of the pedal unit 10A according to the second embodiment that is the same as the pedal unit 10 according to the first embodiment will not be described.

Third Embodiment

The pedal unit 10 according to the first embodiment includes the foot lever 100 in which the center of rotation C is present between the first area 100*r* and the second area 100*f*. In other words, the foot lever 100 has a relationship in which a portion (the first area 100*r*) to which a force is applied by the elastic member 155 and a portion (the second area 100*f*) to be operated by the user sandwich the center of rotation C. This configuration is similar to a pedal of a grand piano. The configuration of the foot lever 100 may be similar to a pedal of an upright piano. In a third embodiment, an example in which a portion operated by the user and a portion to which a force is applied by the elastic member are arranged in the front direction F from the center of rotation C will be described as a configuration similar to a pedal of an upright piano.

Figure 8:
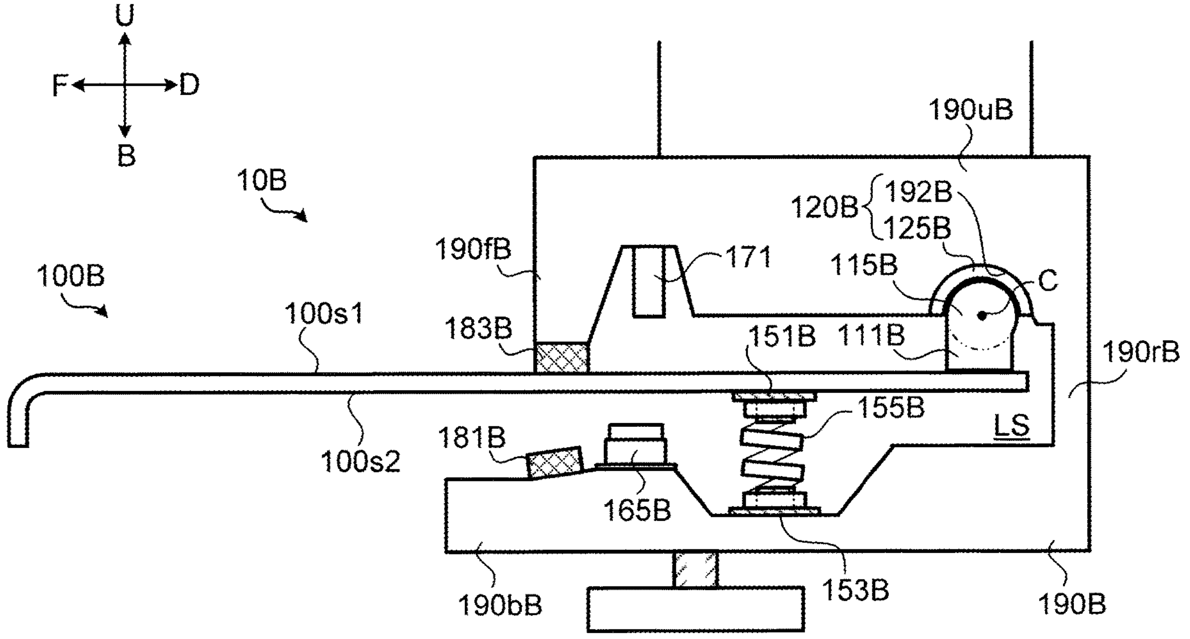
FIG. 8 is a diagram showing a configuration of a pedal unit according to a third embodiment.

FIG. 8 is a diagram showing a configuration of a pedal unit according to the third embodiment. A pedal unit 10B according to the third embodiment has a configuration in which the center of rotation C is arranged in the vicinity of an end portion of a foot lever 100B in the depth direction D (a part closer to a rear portion 190*r*B) than an elastic member 155B. The center of rotation C is formed by a shaft 115B and a bearing 120B on the upper surface 100*s*1 of the foot lever 100B. The shaft 115B is supported by a shaft support portion 111B on the upper surface 100*s*1 of the foot lever 100B. The bearing portion 120B includes a contact portion 125B and a bearing support portion 192B. The bearing support portion 192B is arranged on a ceiling portion 190*u*B.

The elastic member 155B is arranged in the lower space LS. A support member 151B is connected to the bottom surface 100*s*2 of the foot lever 100B and supports an upper end of the elastic member 155B. A support member 153B is connected to a bottom portion 190*b*B and supports a lower end of the elastic member 155B. The elastic member 155B is supported by the support members 151B and 153B in a state of being compressed more than its natural length and applies a force to the foot lever 100B to hold the foot lever 100B in the rest position. The force applied to the foot lever 100B includes a component in the upper direction U.

A lower stopper 181B is arranged on the bottom portion 190*b*B and defines an end position of the foot lever 100B by contacting the bottom surface 100*s*2 of the foot lever 100B. An upper stopper 183B is arranged on a front portion 190*f*B and defines the rest position of the foot lever 100B by contacting the upper surface 100*s*1 of the foot lever 100B.

A reaction force adding member 165B is arranged in the lower space LS. In this example, the reaction force adding member 165B is arranged between the lower stopper 181B and the elastic member 155B. A configuration corresponding to the contact sensor 173 is not present, but may be present.

Even in such a configuration, the more the foot lever 100B is pressed, the more the elastic member 155B is compressed, and the force (normal force) applied from the shaft 115B to the bearing 120B is increased. Therefore, the hysteresis characteristic of the reaction force in the pedal unit 10B shows the same tendency as the hysteresis characteristic of the reaction force in the first embodiment.

Fourth Embodiment

In the first embodiment, the elastic member 155 is arranged in the upper space US. The place where the elastic member 155 that applies a force in the bottom direction B is arranged is not limited to the upper space US. In a fourth embodiment, an example in which the elastic member 155 is arranged in the lower space LS will be described.

Figure 9:
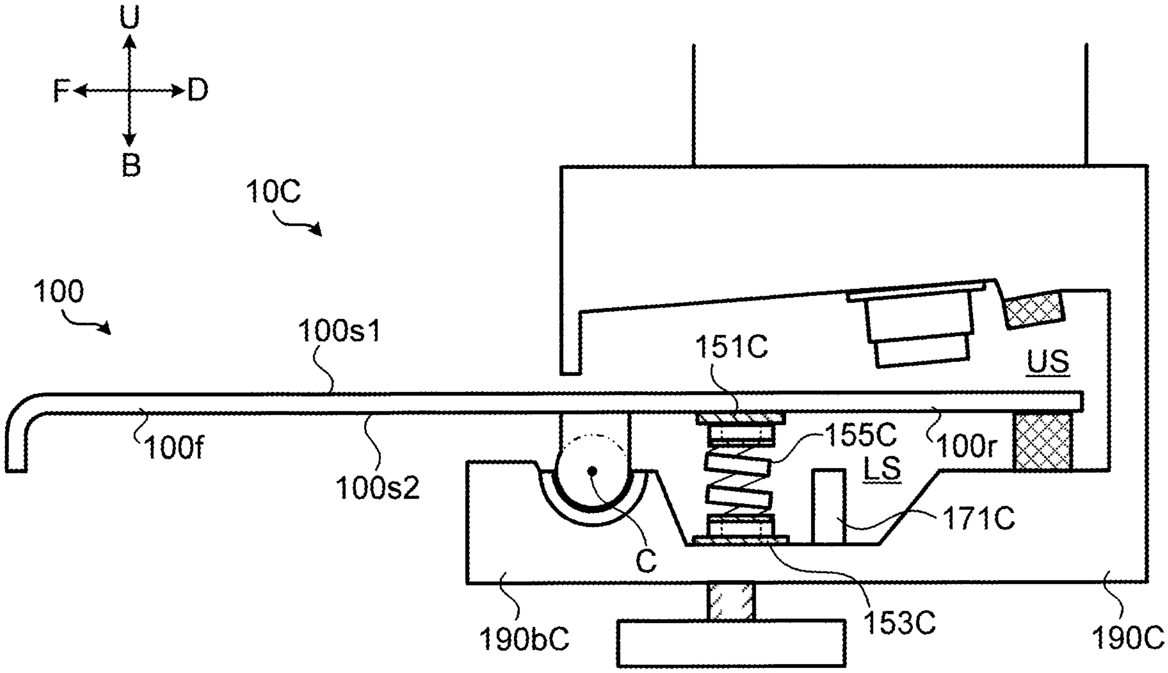
FIG. 9 is a diagram showing a configuration of a pedal unit according to a fourth embodiment.

FIG. 9 is a diagram showing a configuration of a pedal unit according to the fourth embodiment. A pedal unit 10C according to the fourth embodiment includes an elastic member 155C arranged in the lower space LS. A support member 151C is connected to the bottom surface 100*s*2 of the first area 100*r*, supports an upper end of the elastic member 155C, and fixes the upper end of the elastic member 155C so as not to be disengaged in the bottom direction B. A support member 153C is connected to a bottom portion 190*b*C, supports a lower end of the elastic member 155C, and fixes the lower end of the elastic member 155C so as not to be disengaged in the upper direction U.

The elastic member 155C is supported by the support members 151C and 153C in a state extended beyond its natural length and applies a force to the first area 100*r* to hold the foot lever 100 in the rest position. The force applied to the first area 100*r* includes a component in the bottom direction B. That is, the direction of the force received by the first area 100*r* is the same as that in the first embodiment.

In this example, a stroke sensor 171C is also arranged in the lower space LS and measures the displacement of the bottom surface 100*s*2 of the first area 100*r*. The stroke sensor 171C may be arranged in the upper space US. A case 190C has a configuration in which the elastic member 155C and the stroke sensor 171C can be arranged in the lower space LS. Part of the pedal unit 10C according to the fourth embodiment that is the same as the pedal unit 10 according to the first embodiment will not be described.

Fifth Embodiment

The pedal unit 10 according to the first embodiment may have a configuration that applies a further force to the foot lever 100. In a fifth embodiment, an example in which a force is applied to the foot lever 100 in the vicinity of the center of rotation C will be described.

Figure 10:
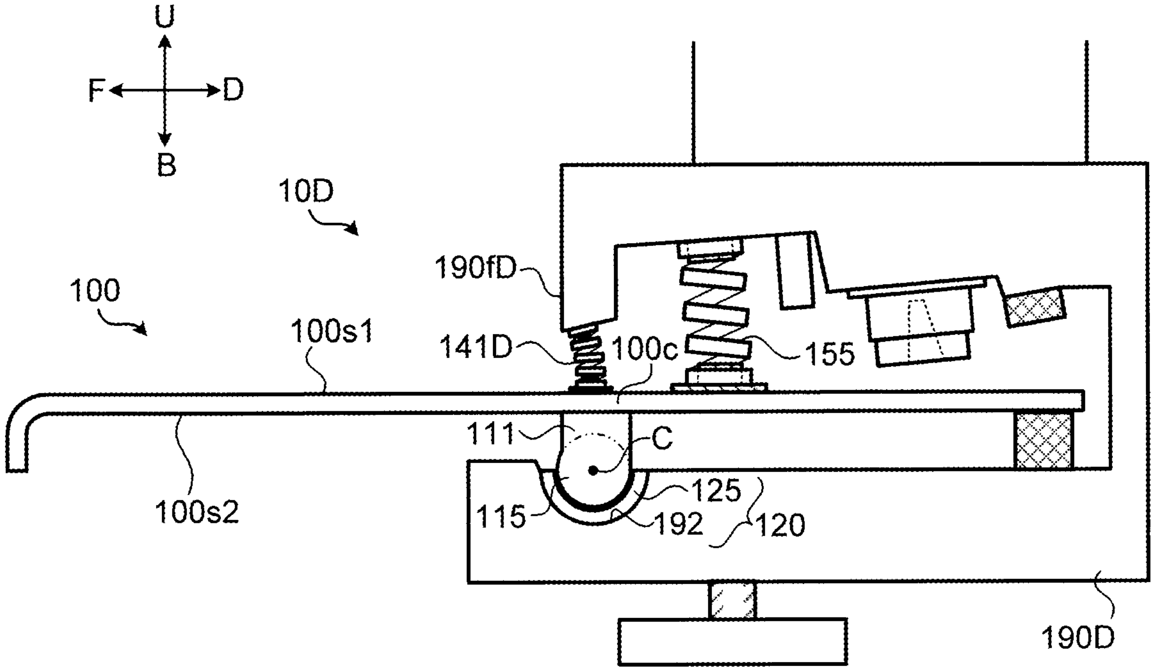
FIG. 10 is a diagram showing a configuration of a pedal unit according to a fifth embodiment.

FIG. 10 is a diagram showing a configuration of a pedal unit according to the fifth embodiment. A pedal unit 10D according to the fifth embodiment includes a power assisting member 141D. In this example, the power assisting member 141D is an elastic member, such as a metal spring, including an upper end supported by the front portion 190*f*D and a lower end supported by the central area 100*c*, and arranged between a front portion 190*f*D and the central area 100*c*.

The power assisting member 141D applies a force to the foot lever 100 so as to press the shaft 115 against the contact portion 125. In this example, the force applied to the foot lever 100 by the power assisting member 141D (in this example, the axial direction of the spring) has a component along at least the radial direction with respect to the center of rotation C. More preferably, the center of rotation C is present at a position extending the axis of the spring when the foot lever 100 is at any position within the range of rotation. For example, it is sufficient that "any position within the range of rotation" may be a state where the foot lever 100 is at a center position between the rest position and the end position.

Unlike the elastic member 155, most of the force applied to the foot lever 100 by the power assisting member 141D is not the force applied in the direction of the rotating foot lever 100 but corresponds to the force that presses the shaft 115 against the contact portion 125. Therefore, the force by the power assisting member 141D hardly changes the force (normal force) applied from the shaft 115 to the bearing 120 (the contact portion 125) depending on the rotation position of the foot lever 100. This point is different from the influence of the elastic member 155 on this normal force. As described above, various reaction forces and hysteresis characteristics can also be created by combining the normal force that varies with the rotation position of the foot lever 100 (the force caused by the elastic member 155) and the normal force that does not vary with the rotation position (the force caused by the power assisting member 141D). Part of the pedal unit 10D according to the fifth embodiment that is the same as the pedal unit 10 according to the first embodiment will not be described.

Sixth Embodiment

Instead of arranging the contact portion 125 at a portion contacting the shaft 115 of the bearing 120, it may be arranged at a portion contacting the bearing as part of the shaft 115. In a sixth embodiment, an example in which the contact portion is arranged at part of the shaft will be described.

Figure 11:
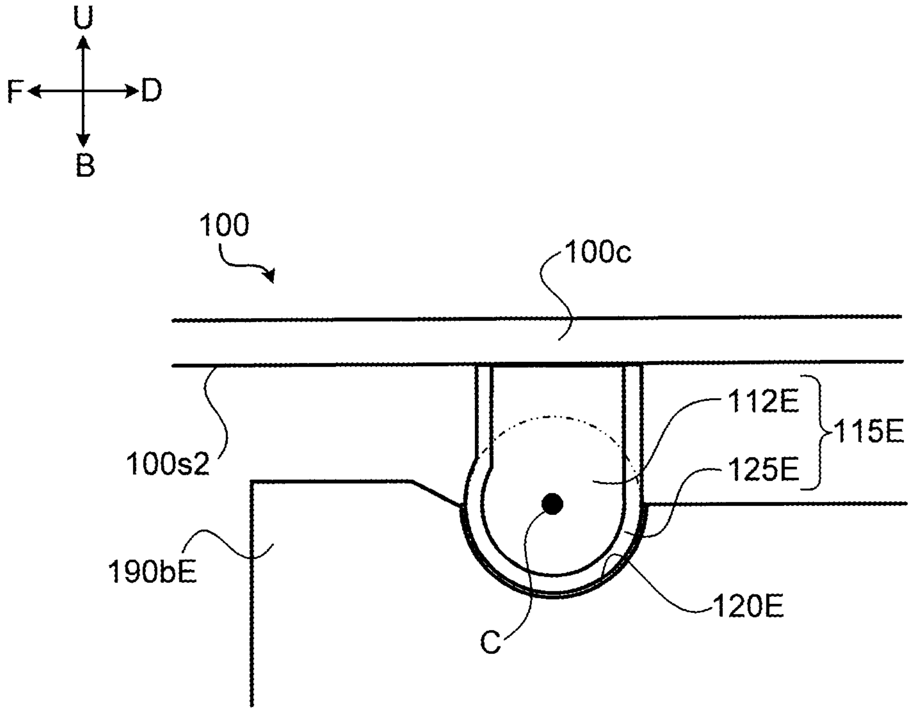
FIG. 11 is a diagram showing a relationship between a shaft and a bearing according to a sixth embodiment.

FIG. 11 is a diagram showing a relationship between a shaft and a bearing according to the sixth embodiment. A shaft 115E according to the sixth embodiment includes a contact portion 125E and a shaft support portion 112E. The contact portion 125E contacts a bearing 120E formed in a bottom portion 190*b*E. As shown in FIG. 11, the contact portion 125E is not limited to being configured to cover the entire surface of the shaft support portion 112E, and may be arranged at least in a portion that contacts the bearing 120E. As in the first embodiment, the contact portion 125E may be configured to be supported by the shaft support portion 112E from the side opposite to the contact surface. The contact portion 125E is formed of a resin different from the resins of the shaft support portion 112E and the bearing 120E (the bottom portion 190*b*E). For the same purpose as in the first embodiment, a relationship between the resin material of the contact portion 125E and the resin material of the bearing 120E (the bottom portion 190*b*E) is determined so as to obtain a desired frictional force between the contact portion 125E and the bearing 120E and reduce wear. The shaft support portion 112E is connected to the bottom surface 100*s*2 of the central area 100*c* to support the contact portion 125E.

The structure of the shaft 115E in the sixth embodiment may be combined with the structure of the bearing 120 in the first embodiment. That is, a configuration corresponding to the contact portion may be arranged in both the shaft and the bearing. In this case, the contact portion of the shaft (corresponding to the contact portion 120E) and the contact portion of the bearing (corresponding to the contact portion 120) are preferably made of different resin materials.

Seventh Embodiment

The shaft 115 may be configured to contact part of the contact portion 125. In a seventh embodiment, an example in which the shaft has a rectangular shape having two distal end angles when viewed in a cross-section perpendicular to the rotation axis, and contacts the contact portion 125 at the two distal end angle portions will be described.

Figure 12:
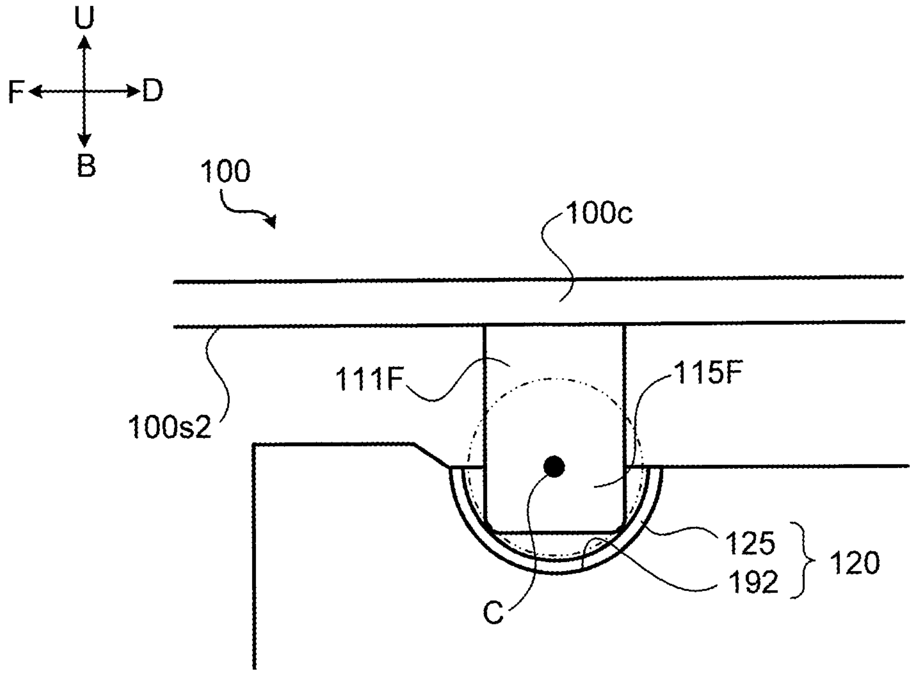
FIG. 12 is a diagram showing a relationship between a shaft and a bearing according to a seventh embodiment.

FIG. 12 is a diagram showing a relationship between a shaft and a bearing in the seventh embodiment. A shaft 115F in the seventh embodiment is supported by a shaft support portion 111F connected to the bottom surface 100*s*2 of the central area 100*c*. The shaft 115F has a portion having two distal end angles in a cross-section perpendicular to the rotation axis. The two distal end angle portions contact the contact portion 125. Since the distance from the center of rotation C (corresponding to the radius of curvature DD) at both of the two contact portions is the same, the foot lever 100 can rotate. The two distal end angle portions of the shaft 115F may have curved surfaces, may form part of an arc of the radius of curvature DD about the center of rotation C, or an arc with a radius smaller than the radius of curvature DD.

As described above, since the foot lever 100 rotates while the shaft 115F contacts part of the bearing 120, the normal force is stabilized as compared with the relationship between the shaft 115 and the bearing 120 in the first embodiment, and further, it is possible to stabilize the direction of the rotation axis and suppress the upper distal end portion 100*fe* of the foot lever 100 from moving in the left-right direction.

Eighth Embodiment

Contrary to the seventh embodiment, a configuration in which the shaft 115 contacts part of the contact portion 125 may have a configuration in which the bearing has a shape other than an arc shape when viewed in a cross-section perpendicular to the rotation axis. In the eighth embodiment, an example in which a shape of a bearing in the shaft 115E in the sixth embodiment is different from that of the sixth embodiment will be described.

Figure 13:
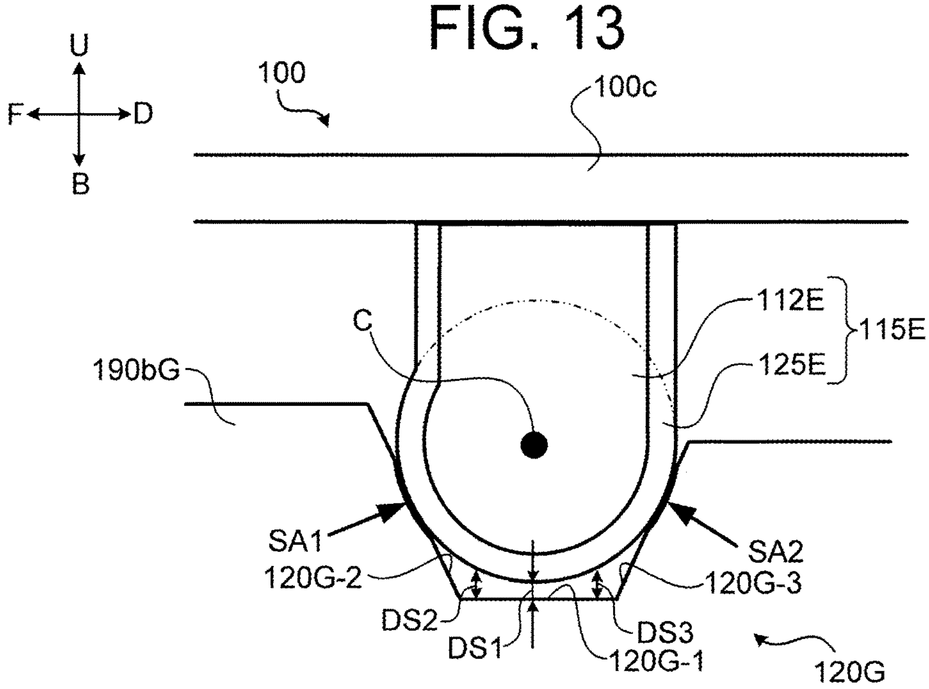
FIG. 13 is a diagram showing a relationship between a shaft and a bearing according to an eighth embodiment.

FIG. 13 is a diagram showing a relationship between a shaft and a bearing in the eighth embodiment. A bearing 120G is formed in a bottom portion 190*b*G and includes a bottom surface 120G-1, a front inclined surface 120G-2, and a rear inclined surface 120G-3. The bottom surface 120G-1 forms a horizontal plane. The front inclined surface 120G-2 is a plane arranged inclined in the front direction F of the bottom surface 120G-1. The rear inclined surface 120G-3 is a plane arranged inclined in the depth direction D of the bottom surface 120G-1. The front inclined surface 120G-2 contacts the contact portion 125E in an area SA1. The rear inclined surface 120G-3 contacts the contact portion 125E in an area SA2. The area SA1 is separated from the area SA2. The area SA1 and the area SA2 may be shaved along a surface shape (arc shape) of the contact portion 125E. In this case, recesses along the surface shape of the contact portion 125E in part of the plane are formed on the front inclined surface 120G-2 and the rear inclined surface 120G-3.

In this example, a distance between the bottom surface 120G-1 and the contact portion 125E is determined as follows. Among the bottom surface 120G-1, a first position between the area SA1 and the area SA2, a second position between the first position and the area SA1, and a third position between the first position and the area SA2 are defined. That is, the second position, the first position, and the third position are arranged in this order in the depth direction D. In this example, the first position is a portion directly below the center of rotation C. As shown in FIG. 13, a distance between the first position of the bottom surface 120G-1 and the contact portion 125E is referred to as a first separation distance DS1. A distance between the second position of the bottom surface 120G-1 and the contact portion 125E is referred to as a second separation distance DS2. A distance between the third position of the bottom surface 120G-1 and the contact portion 125E is referred to as a third separation distance DS3.

According to this definition, the first separation distance DS1 is shorter than the second separation distance DS2 and the third separation distance DS3. According to such a relationship, the area SA1 and the area SA2 are shaved and the shaft 115E is moved in the bottom direction B, and a lower end portion of the contact portion 125E contacts the bottom surface 120G-1, thereby suppressing further downward movement in the bottom direction B. If the shaft 115E continues to move downward in the bottom direction B, the shaft 115E may be fitted into the bearing 120G depending on the circumstances, and the frictional force generated between the shaft 115E and the bearing 120G when the foot lever 100 rotates may become very large. Suppressing the downward movement of the shaft 115E in the bottom direction B makes it possible to suppress the shaft 115E from being fitted into the bearing 120G.

The relationship that the first separation distance DS1 is shorter than the second separation distance DS2 and the third separation distance DS3 is not limited to the case where the bottom surface 120G-1 is a horizontal plane. For example, a surface protruding in the upper direction U may be formed at a portion corresponding to the first position of the bottom surface 120G-1.

Ninth Embodiment

The contact portion 125 may have a configuration in which two or more different materials are exposed on the contact surface. In a ninth embodiment, an example in which materials different between the center portion and both end portions in the left-right direction are exposed on the contact surface at the contact portion will be described.

Figure 14:
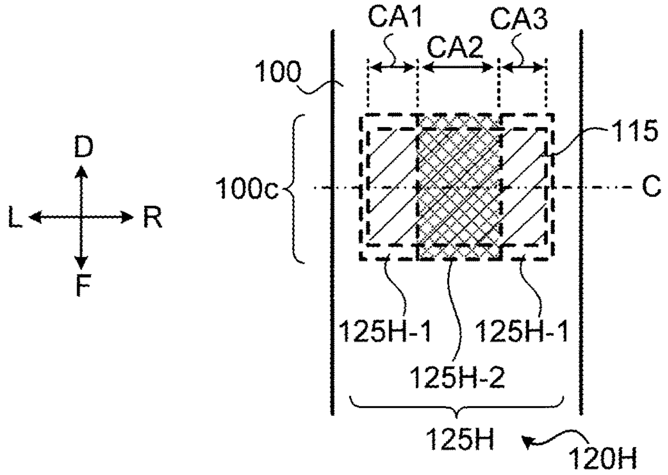
FIG. 14 is a diagram showing a configuration of a contact portion according to a ninth embodiment.
Figure 15:
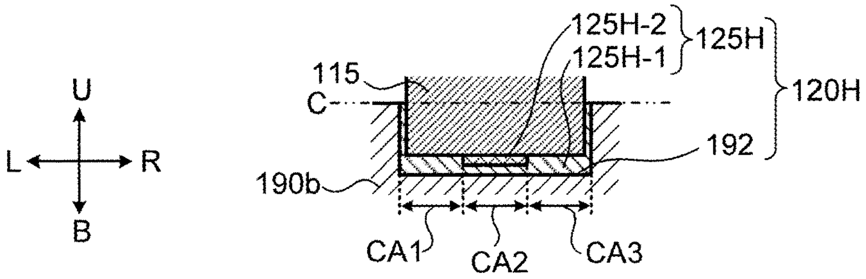
FIG. 15 is a diagram showing a cross-sectional configuration of a contact portion according to the ninth embodiment.

FIG. 14 is a diagram showing a configuration of the contact portion according to the ninth embodiment. FIG. 15 is a diagram showing a cross-sectional configuration of the contact portion according to the ninth embodiment. Similar to FIG. 4, FIG. 14 shows a positional relationship between the shaft 115 and a bearing 120H when the foot lever 100 is viewed in a direction (in this case, the bottom direction B) perpendicular to the center of rotation C (rotation axis). FIG. 15 shows a cross-section when the shaft 115 and the bearing 120H are cut along a plane, including the rotation axis, along the up-down direction.

In this example, a contact portion 125H of the bearing 120H includes a reinforcement portion 125H-1 and a high friction portion 125H-2. The reinforcement 125H-1 contacts the shaft 115 at a first contact area CA1 and a third contact area CA3. The high friction portion 125H-2 contacts the shaft 115 in the second contact area CA2. The first contact area CA1 and the third contact area CA3 are arranged with the second contact area CA2 interposed therebetween. In this example, the second contact area is arranged in the central portion in the left-right direction. The first contact area CA1 and the third contact area CA3 are arranged symmetrically with respect to the second contact area CA2.

As shown in FIG. 15, the high friction portion 125H-2 is arranged so as to be exposed on the contact surface side (shaft 115 side) of the contact portion 125H, and is supported by the reinforcement portion 125H-1 on the bearing support portion 192 side. The high friction portion 125H-2 may also contact the bearing support portion 192 by being exposed to the bearing support portion 192 side. The reinforcement portion 125H-1 may be formed integrally with the case 190.

In this example, the coefficient of friction for the shaft 115 in the high friction portion 125H-2 is greater than the coefficient of friction for the shaft 115 in the reinforcement portion 125H-1. The frictional force when the foot lever 100 rotates can be appropriately set by setting the material selection of the high friction portion 125H-2 and the size of the second contact area CA2.

In this case, if the friction coefficient is large, the rigidity of the reinforcement portion 125H-1 may be lower than the rigidity of the reinforcement portion 125H-2 due to the selection of the material of the reinforcement portion 125H-1 and the high friction portion 125H-2. Even in this case, since the reinforcement portion 125H-1 supports the shaft 115 at both end sides (the first contact area CA1 and the third contact area CA3) of the contact portion 125H, the bearing 125H (contact portion 125H) and the shaft 115 can maintain a stable contact state even if the rigidity at the central portion (the second contact area CA2) is low.

Tenth Embodiment

The shaft 115 and the bearing 120 which generate a frictional force by the rotation of the foot lever 100 are arranged in an area in the bottom direction B of the foot lever 100 (hereinafter referred to as an inner area). A portion that causes friction due to the rotation of the foot lever 100 may also be formed in an area outside that area (hereinafter referred to as an outer area). In a tenth embodiment, an example in which the shaft of the inner area extends to the outer area, and the outer area also has a configuration corresponding to the shaft and the bearing, thereby generating a frictional force will be described.

Figure 16:
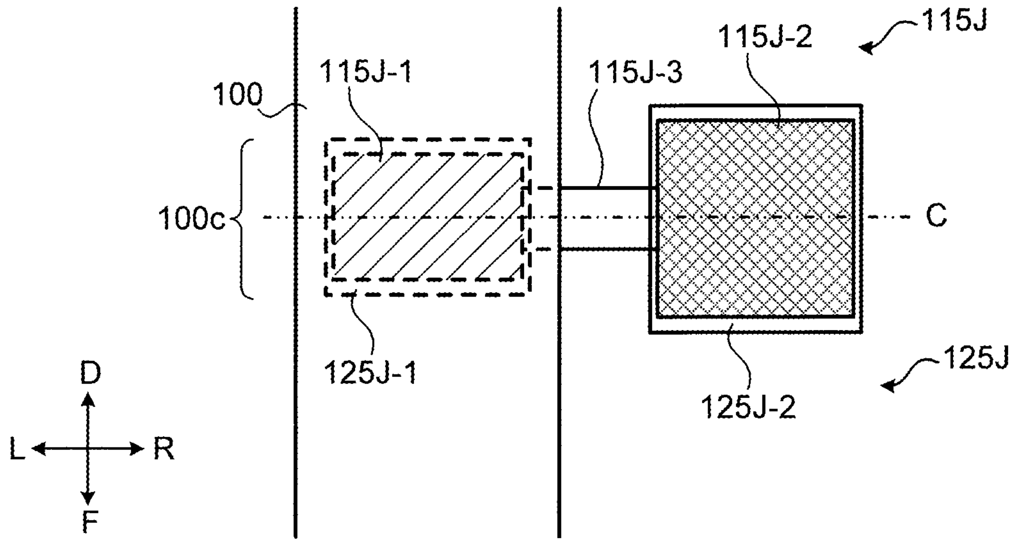
FIG. 16 is a diagram showing a shaft and a bearing according to a tenth embodiment.
Figure 17:
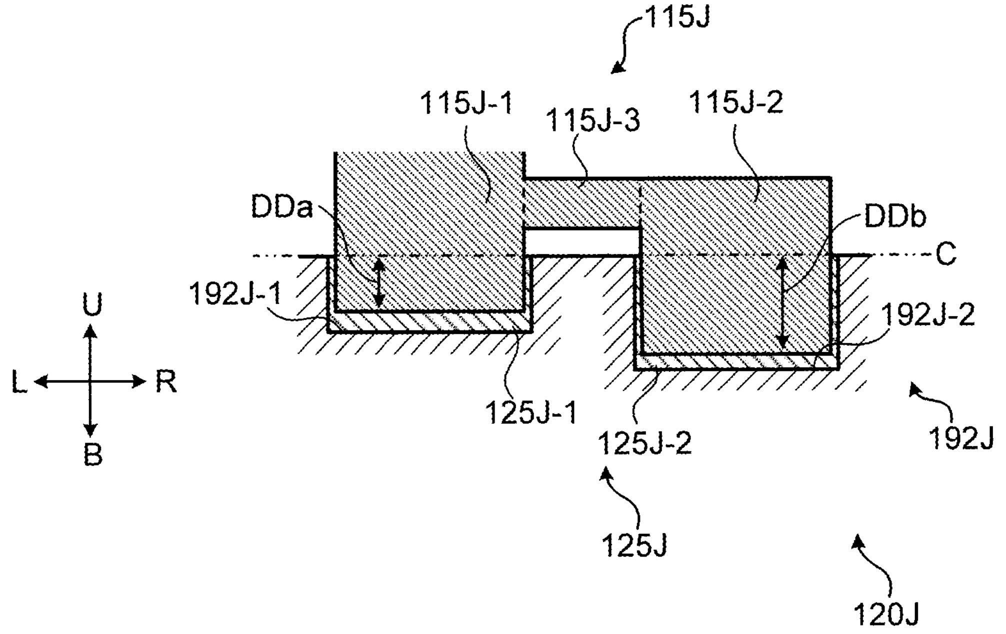
FIG. 17 is a diagram showing a configuration of a shaft and a bearing according to the tenth embodiment.

FIG. 16 is a diagram showing a shaft and a bearing in the tenth embodiment. FIG. 17 is a diagram showing a configuration of a cross-section of a shaft and a bearing in the tenth embodiment. As in FIG. 4, FIG. 16 shows a positional relationship between a shaft 115J and a bearing 120J when the foot lever 100 is viewed in a direction (in this case, the bottom direction B) perpendicular to the center of rotation C (rotation axis). FIG. 17 shows a cross-section when the shaft 115J and the bearing 120J are cut along a plane, including the rotation axis, along the up-down direction.

The shaft 115J includes an inner shaft portion 115J-1, an outer shaft portion 115J-2, and a connecting portion 115J-3. The inner shaft portion 115J-1 is arranged in the inner area. The outer shaft portion 115J-2 is arranged in the outer area. The connecting portion 115J-3 connects the inner shaft portion 115J-1 and the outer shaft portion 115J-2. Although the connecting portion 115J-3 is arranged at a position deviated from the center of rotation C, the connecting portion 115J-3 is linked with the inner shaft portion 115J-1 and the outer shaft portion 115J-2.

The bearing 120J includes a contact portion 125J and a bearing support portion 192J. The contact portion 125J includes an inner contact portion 125J-1 and an outer contact portion 125J-2 (a third member). The bearing support portion 192J includes an inner bearing support portion 192J-1 and an outer bearing support portion 194J-2. The inner contact portion 125J-1 contacts the inner shaft portion 115J-1 in the inner area and is supported by the inner bearing support portion 192J-1. The outer contact 125J-2 contacts the outer shaft portion 115J-2 in the outer area and is supported by an outer bearing support portion 192J-2. The inner bearing support portion 192J-1 and the outer bearing support portion 192J-2 are formed in a bottom portion 190*b*J.

The arc forming a contact surface between the inner shaft portion 115J-1 and the inner contact portion 125J-1 and the arc forming a contact surface between the outer inner shaft portion 115J-2 and the outer contact portion 125J-2 each have the same center (center of rotation C). In other words, each of the two arcs corresponding to each contact surface corresponds to part of a concentric circle with the center of rotation C as the common center when each contact surface is viewed along the rotation axis.

In the case where the foot lever 100 rotates, the inner shaft portion 115J-1 and the inner contact portion 125J-1 slide, and the outer shaft portion 115J-2 and the outer contact portion 125J-2 slide. That is, the inner shaft portion 115J-1, the outer shaft portion 115J-2, and the connecting portion 115J-3 rotate in conjunction with each other. This creates a frictional force in both contact surfaces. As shown in FIG. 17, a distance from the center of rotation C (rotation axis) to a contact surface where the inner shaft portion 115J-1 contacts the inner contact portion 125J-1 is referred to as a radius of curvature DDa. A distance from the center of rotation C (rotation axis) to a contact surface where the outer shaft portion 115J-2 contacts the outer contact portion 125J-2 is referred to as a radius of curvature DDb. An area where the inner shaft portion 115J-1 contacts the inner contact portion 125J-1 and an area where the outer shaft portion 115J-2 contacts the outer contact portion 125J-2 may be set as appropriate.

In this example, the radius of curvature DDb is greater than the radius of curvature DDa, but the present invention is not limited thereto. That is, the radius of curvature DDa and the radius of curvature DDb may be the same, or the radius of curvature DDb may be smaller than the radius of curvature DDa. The inner contact portion 125J-1 and the outer contact portion 125J-2 may be formed of the same material or may be formed of different materials so as to have different frictional coefficients with respect to the shaft 115J. Similarly, for the shaft 115J, the inner shaft portion 115J-1 and the outer shaft portion 115J-2 may be formed of the same material or may be formed of different materials. In this example, although the outer shaft portion 115J-2 and the outer contact portion 125J-2 present in the outer area are arranged in the right direction R with respect to the inner area, they may be arranged in the left direction L, or may be arranged in both directions.

Since the foot lever 100 is not present in the outer area, the outer shaft portion 115J-2 and the outer contact portion 125J-2 can be arranged with a high degree of freedom. Therefore, for example, the outer contact portion 125J-2 may be formed to surround the outer shaft portion 115J-2. The inner shaft portion 115J-1 and the outer shaft portion 115J-2 may be detachably formed. In this case, the connecting portion 115J-3 is configured such that a rotating force applied at least to the inner shaft portion 115J-1 can be transmitted to the outer shaft portion 115J-2. In this case, the bearing support portion 192J-2 supporting the outer contact portion 125J-2 may be detachably formed with respect to the bottom portion 190*b*J (case). As a result, a mechanism that generates a frictional force on the outer area may be attached to the foot lever 100 of the first embodiment.

Eleventh Embodiment

The shaft 115 is not limited to being connected to the foot lever 100 or the case 190. In an eleventh embodiment, a pedal unit 10K having a detachable shaft 115K will be described.

Figure 18:
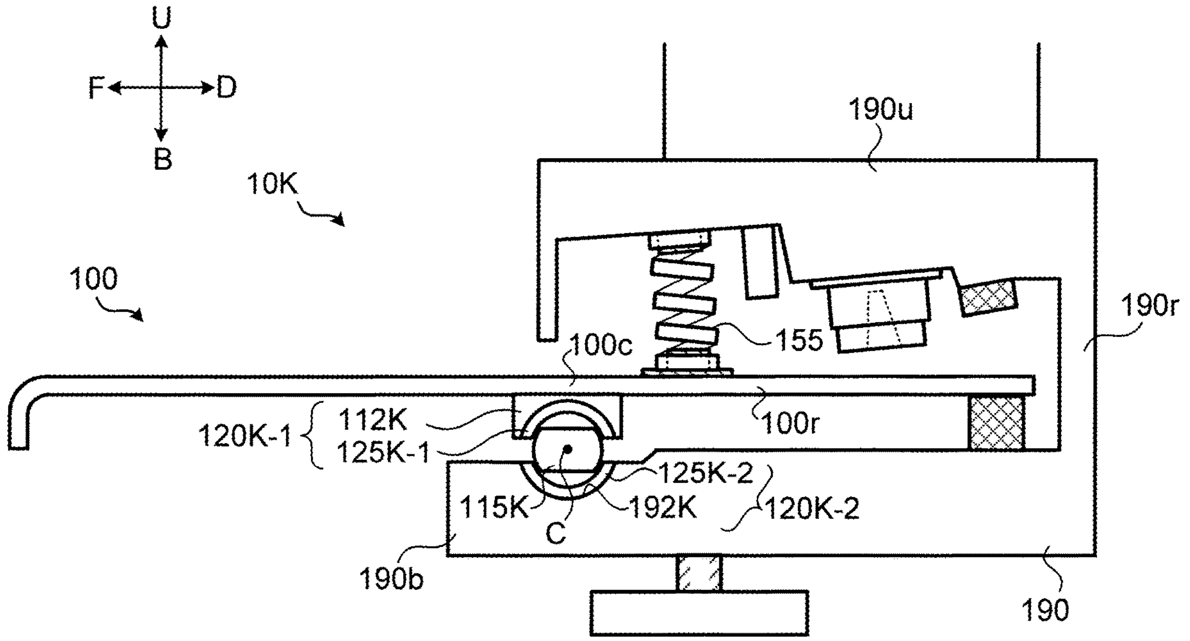
FIG. 18 is a diagram showing a configuration of a pedal unit according to an eleventh embodiment.

FIG. 18 is a diagram showing a configuration of a pedal unit according to the eleventh embodiment. The pedal unit 10K according to the eleventh embodiment includes a first bearing 120K-1 fixed to the foot lever 100 and a second bearing 120K-2 fixed to the case 190. The first bearing 120K-1 includes a bearing support portion 112K and a contact portion 125K-1. The first bearing 120K-1 has a configuration corresponding to the bearing 120A in the second embodiment. The second bearing 120K-2 includes a bearing support portion 192K and a contact portion 125K-2. The second bearing 120K-2 has a configuration corresponding to the bearing 120 in the first embodiment.

The shaft 115K is sandwiched between the first bearing 120K-1 and the second bearing 120K-2. The first bearing 120K-1 and the second bearing 120K-2 are forced so as to approach each other by the elastic member 155. Therefore, the shaft 115K is rotatably held in an inner surface formed by the contact portions 125K-1 and 125K-2.

The shaft 115K contacts at least two areas separated from each other in the first bearing 120K-1 (the contact portion 125K-1) and is separated from an area between the two areas. The shaft 115K further contacts at least two areas separated from each other in the second bearing 120K-2 (the contact portion 125K-2) and is separated from an area between the two areas. Therefore, the shaft 115K may have a circular shape when viewed in the left-right direction, but is not limited to a circular shape as shown in FIG. 18. That is, as described above, each of the first bearing 120K-1 and the second bearing 120K-2 may be configured to contact the two areas.

When the foot lever 100 is pressed, the shaft 115K and the contact portion 125K-1 slide and the foot lever 100 rotates. In this case, the shaft 115K may or may not rotate because it is sufficient that the shaft 115K and the contact portion 125K-1 slide relatively. Therefore, the shaft 115K may not be fixed or fixed with respect to the case 190. For example, in the case where the shaft 115K is fixed to the case 190, the positional relationship between the shaft 115K and the case 190 may be fixed with respect to at least one of the rotation direction and the left-right direction, or both. Also in this case, the shaft 115K is configured to be detachable from the case 190. Therefore, inserting the shaft 115K at the end makes it possible to manufacture the pedal unit 10K or replace the shaft by taking out the shaft 115K.

Figure 19:
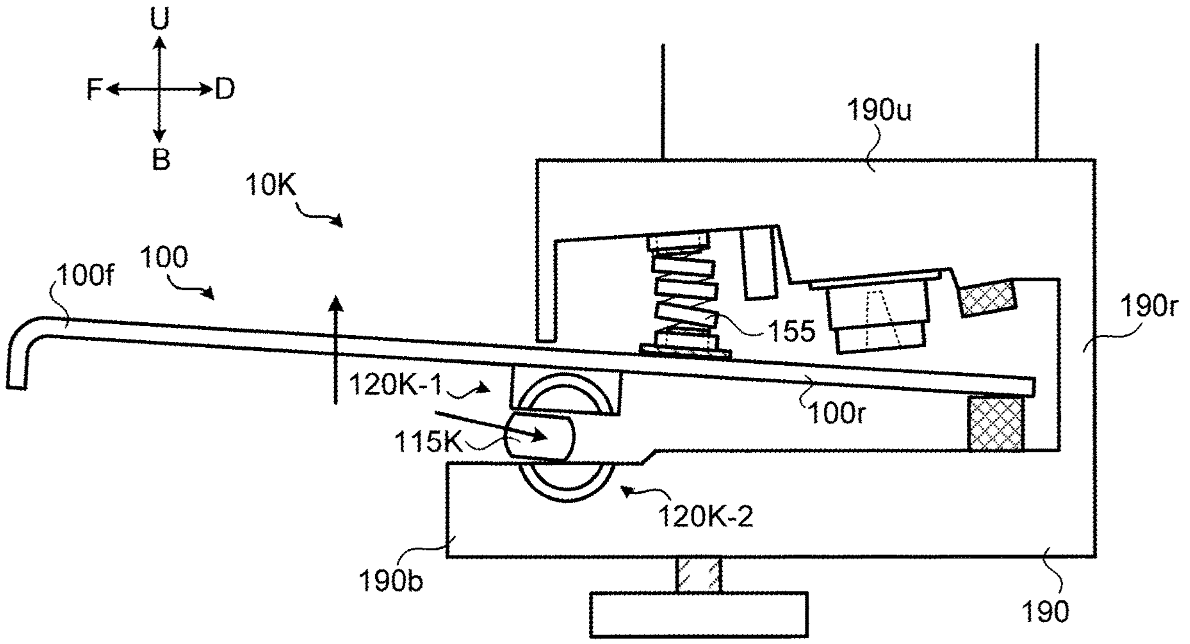
FIG. 19 is a diagram showing a movement of a pedal unit when a shaft is inserted according to the eleventh embodiment.

FIG. 19 is a diagram showing a movement of the pedal unit when inserting the shaft in the eleventh embodiment. For example, in the case where the pedal unit 10K is manufactured by inserting the shaft 115K at the end, as shown in FIG. 19, the second area 100*f* of the foot lever 100 is lifted in the upper direction U so as to reduce the elastic member 155, thereby expanding a gap formed in the first bearing 120K-1 and the second bearing 120K-2. In that state, the configuration of FIG. 18 is realized by inserting the shaft 115K into the gap and returning the position of the foot lever 100 again.

Twelfth and Thirteenth Embodiments

In the case where the elastic member 155 is a coil spring (hereinafter, may be simply referred to as a spring), particularly a closed-end type coil spring, mechanical noise may be generated during expansion and contraction of the spring depending on the positional relationship between the elastic member 155 and the support member 151 and 153. The closed-end type coil spring has a configuration in which an end portion of the winding of the spring contacts an adjacent winding. The positional relationship between the end portion of the winding and the adjacent winding may greatly deviate depending on how the force is received when the spring is expanded or contracted, and noise may occur. Even if the elastic member is not of the closed-end type, noise may occur in the same way if a structure occurs in which the end portion of the spring contacts the adjacent winding in the process of contracting the spring. In the twelfth and thirteenth embodiments, a configuration for reducing such noise will be described.

Figure 20:
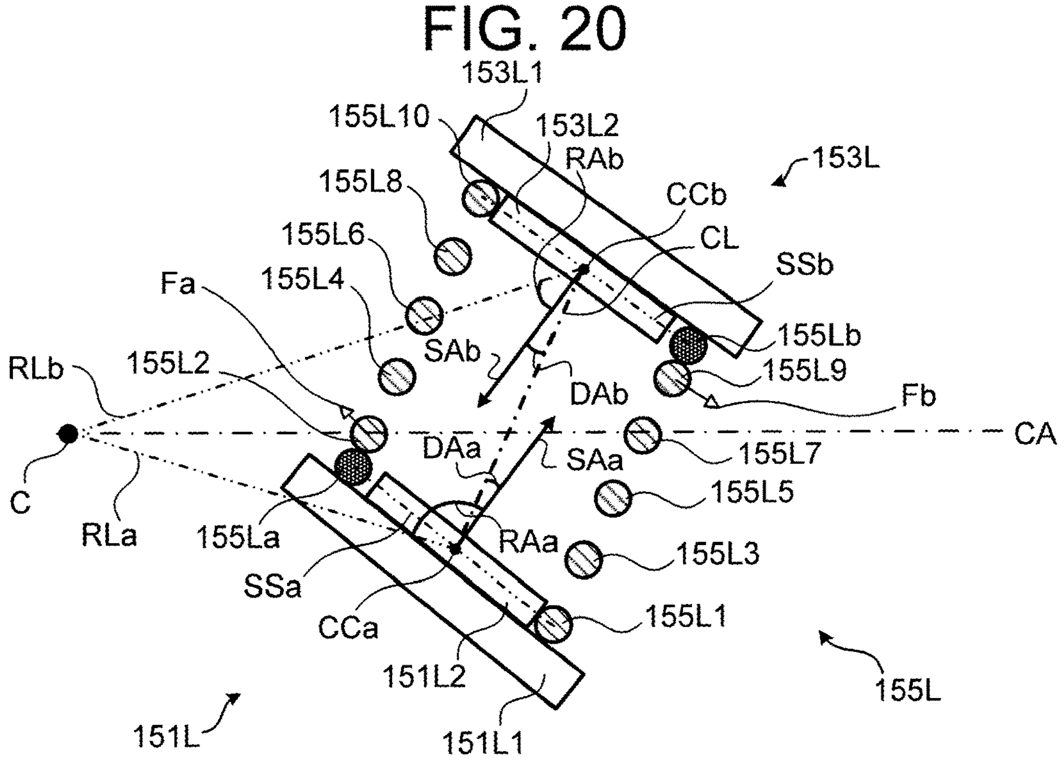
FIG. 20 is a diagram showing a shape (rest position) of a spring according to a twelfth embodiment.
Figure 21:
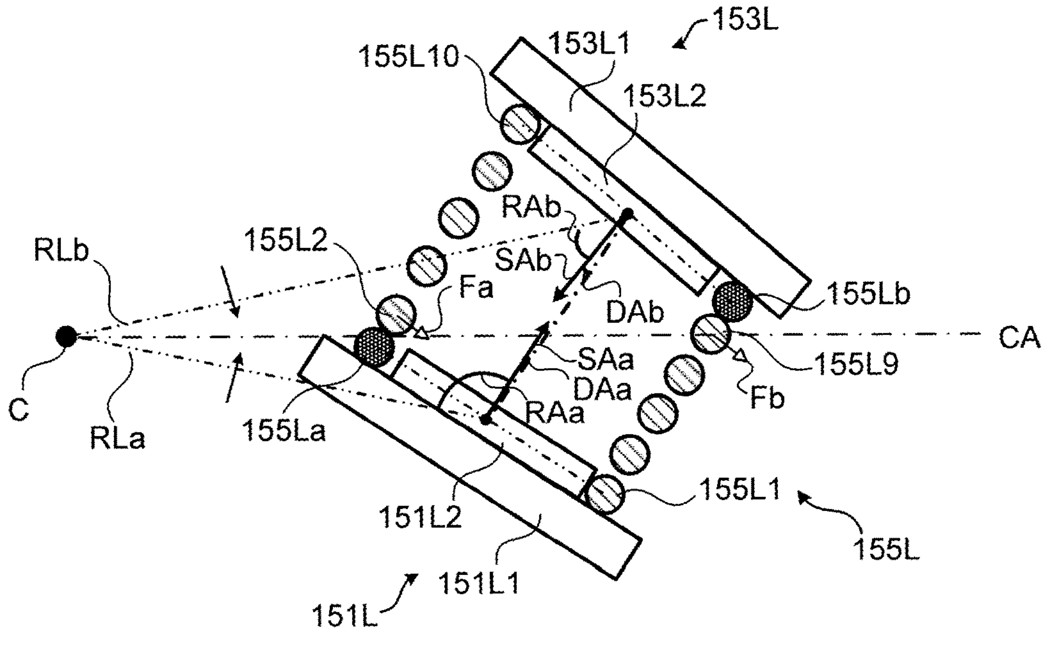
FIG. 21 is a diagram showing a shape (end position) of a spring according to the twelfth embodiment.

FIG. 20 is a diagram showing a shape of a spring (rest position) according to a twelfth embodiment. FIG. 21 is a diagram showing a shape of a spring (end position) according to the twelfth embodiment. In the following explanation, parts corresponding to the elastic member 155 and the support members 151 and 153 are extracted and explained.

An elastic member 155L is a coil-shaped spring and has a winding connecting a first end portion 155La and a second end portion 155Lb. In FIG. 20 and FIG. 21, the winding is shown by a cross-section passing through the central axis of the spring and including the front-rear direction and the up-down direction. That is, the winding is connected in the order of the first end portion 155La, winding cross-sections 155L1, 155L2, . . . 155L10, and the second end portion 155Lb. In this example, the elastic member 155L is a closed-end type coil spring. Therefore, a side surface in the first end portion 155La contacts a side surface in the winding cross-section 155L2 adjacent to the first end portion 155La. A side surface of the second end portion 155Lb contacts a side surface of the winding cross-section 155L9 adjacent to the second end portion 155Lb.

A support member 151L includes a base portion 151L1 and a protruding portion 151L2. A support member 153L includes a base 153L1 and a protruding portion 153L2. The base portions 151L1 and 153L1 are arranged to limit the extension of the elastic member 155L. The protruding portion 151L2 protrudes from the base portion 151L1 so as to be arranged in a space inside the spring. The protruding portion 153L2 protrudes from the base 153L1 so as to be arranged in the space inside the spring. The protruding portions 151L2 and 153L2 limit the lateral displacement of the spring by contacting the winding from the space inside the spring.

A first cross-section SSa is defined as a plane passing through the center of the first end portion 155La and the center of the winding cross-section 155L1 and includes the radial direction of the spring. A first center position CCa is defined as a center in the first cross-section SSa. A first axial direction SAa is defined as a direction perpendicular to the first cross-section SSa and faces the inner side of the spring from the first central position CCa. A second cross-section SSb is defined as a plane passing through the center of the second end portion 155Lb and the center of the winding cross-section 155L10 and includes the radial direction of the spring. A second center position CCb is defined as a center in the second cross-section SSb. A second axial direction SAb is defined as a direction perpendicular to the second cross-section SSb and faces the inner side of the spring from the second central position CCb.

A centerline CL is defined as a line connecting the first center position CCa and the second center position CCb. The centerline CL can also be referred to as the central axis of the spring. A first angle DAa is defined as an angle formed by the centerline CL and the first axial direction SAa. A second angle DAb is defined as the angle formed by the centerline CL and the second axial direction SAb. A third angle RAa is defined as an angle formed by a line RLa connecting the rotation axis (center of rotation C) and the first center position CCa and the first axial direction SAa. A fourth angle RAb is defined as an angle formed by a line RLb connecting the rotation axis (center of rotation C) and the second center position CCb and the second axial direction SAb. The third angle RAa and the fourth angle RAb have constant values regardless of the rotation of the foot lever 100. A line CA is a bisector of a corner formed by the line RLa and the line RLb. FIG. 20 and FIG. 21 are shown with reference to the line CA. The descriptions and definitions of the configurations of FIG. 20 and FIG. 21 described above are the same in the drawings described below, and descriptions of the configurations with similar symbols may be omitted.

The shape of the elastic member 155L changes within the range of rotation of the foot lever 100, for example, between FIG. 20 and FIG. 21. This is because the positional relationship and the inclination between the support member 151L and the support member 153L change around the center of rotation C when the foot lever 100 rotates. This results in a situation in which the first angle DAa and the second angle DAb are not 0 degrees. This situation indicates that the force applied to the spring includes not only an expansion and contraction direction component of the spring but also a radial direction component of the spring. The force of the radial direction component of the spring increases in portions closer to the support members 151L and 153L.

Therefore, with respect to portions of the adjacent winding that are close to or in contact with each other among the adjacent windings, since a strong force is also generated in the radial direction of the spring when the spring contracts, the positional relationship is abruptly shifted, and noise may occur. For example, the side surface of the first end portion 155La contacts a side surface of the winding cross-section 155L2 adjacent to the first end portion 155La. A winding portion of the winding cross-section 155L2 receives a force in a direction of an arrow shown in FIG. 20 and FIG. 21. If this force becomes too large, the winding portion of the winding cross-section 155L2 may fall off in the direction receiving the force. This falling-off creates mechanical noise.

As described above, a force Fa applied to the winding portion of the winding cross-section 155L2 increases as the first axial direction SAa deviates from the centerline CL, that is, as the first angle DAa increases. A force Fb applied to the winding portion of the winding cross-section 155L9 increases as the second axial direction SAb deviates from the centerline CL, that is, as the second angle DAb increases.

Therefore, the inventors have confirmed that it is preferable to satisfy the following condition to suppress the occurrence of this falling-off. The condition is that at least one of the first angle DAa and the second angle DAb becomes smaller when the foot lever 100 moves in a direction in which the spring contracts in at least part of the range of rotation of the foot lever 100. At least part of the range of rotation includes a state in which the spring within the range of rotation is most extended. In other words, it can be said that at least one of the first angle DAa and the second angle DAb becomes smaller when the foot lever 100 moves in the direction in which the spring contracts from the state in which the spring within the range of rotation of the foot lever 100 is most extended.

As a result, at least one of the force Fa and the force Fb can be reduced when the spring contracts.

It is preferable that the larger one of the first angle DAa and the second angle DAb satisfies the above condition in a state in which the spring is most extended within the range of rotation of the foot lever 100 (in this example, the state in which the foot lever 100 is in the rest position).

The above condition may be satisfied in all of the range of rotation of the foot lever 100. In this case, at least one of the first angle DAa and the second angle DAb may be greater than 0 degrees. In the case where the above condition is satisfied in part of the range of rotation of the foot lever 100, at least one of the first angle DAa and the second angle DAb becomes 0 degrees at any position within the range of rotation of the foot lever 100 due to the contraction of the spring. In this case, when the spring further contracts, the magnitude of the first angle DAa or the second angle Dab, which has become 0 degrees, increases again. In this case, even when the foot lever 100 is at the end position, that angle is preferably 10 degrees or less.

Further, at least one of the third angle RAa and the fourth angle RAb is preferably less than 90 degrees.

Part of the examples that satisfy the above condition in the twelfth and thirteenth embodiments is shown below, and an example that does not satisfy the above condition is shown as Comparative Examples 1 and 2. The examples that satisfy the above condition include the case where at least part of the condition which is preferably satisfied is not satisfied.

In an example of the support members 151L and 153L and the elastic member 155L shown in FIG. 20 and FIG. 21, the following situation occurs when the foot lever 100 moves from the rest position to the end position. The first angle DAa decreases in part of the range of rotation of the foot lever 100, and finally increases, but is 10 degrees or less. The second angle DAb decreases in all of the range of rotation of the foot lever 100. The second angle DAb is greater than the first angle DAa when the foot lever 100 is in the rest position. The third angle RAa is 90 degrees or more. The fourth angle RAb is less than 90 degrees.

The positional relationship between the support member 151L and the support member 153L may be interchanged with respect to the line CA. For example, changes in the first angle DAa and the second angle DAb may be interchanged. This positional relationship can be similarly applied in the example described below.

Figure 22:
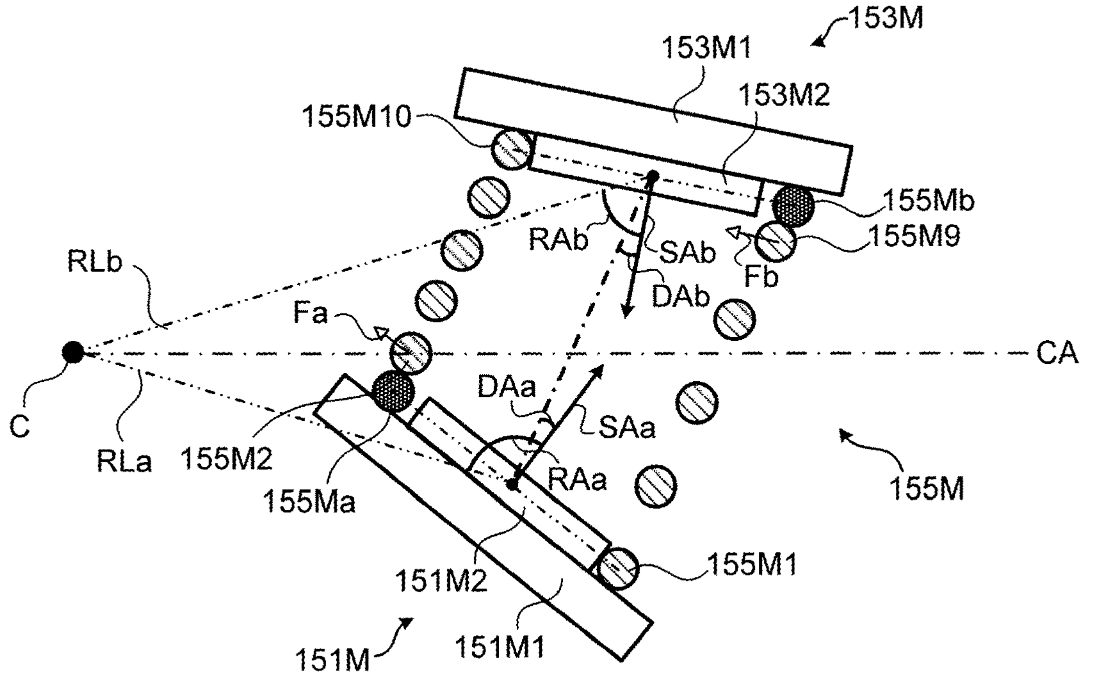
FIG. 22 is a diagram showing a shape (rest position) of a spring according to a thirteenth embodiment.
Figure 23:
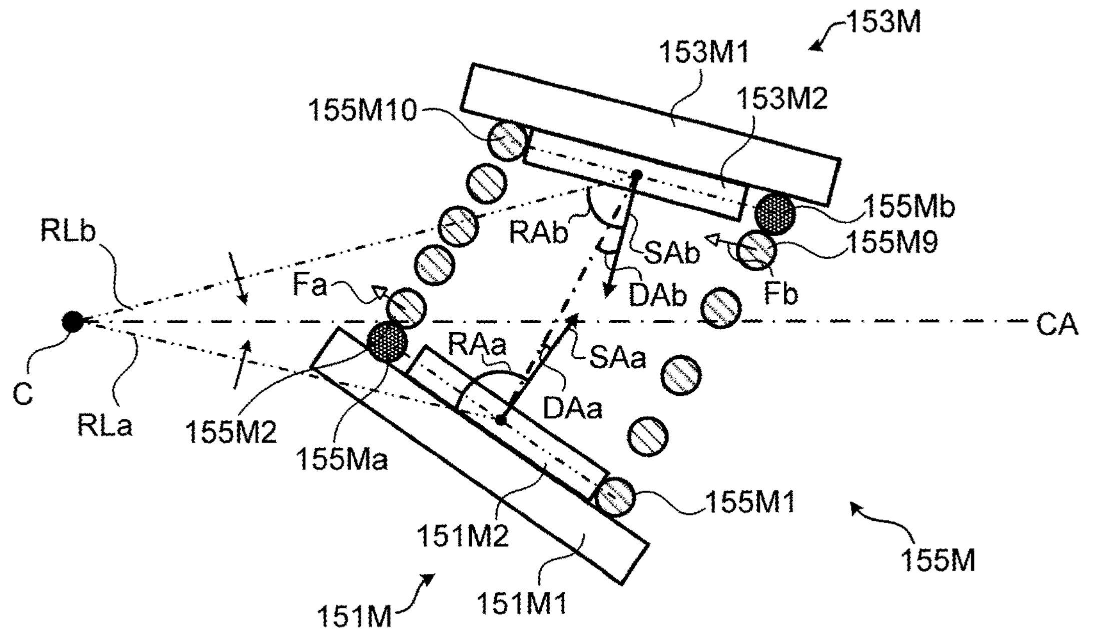
FIG. 23 is a diagram showing a shape (end position) of a spring according to the thirteenth embodiment.

FIG. 22 is a diagram showing a shape of a spring (rest position) in the thirteenth embodiment. FIG. 23 is a diagram showing a shape of a spring (end position) in the thirteenth embodiment. In the examples of support members 151M and 153M and an elastic member 155M shown in FIG. 22 and FIG. 23, the following situation occurs when the foot lever 100 moves from the rest position to the end position. The first angle DAa decreases in all of the range of rotation of the foot lever 100. The second angle DAb increases in all of the range of rotation of the foot lever 100. The first angle DAa is greater than the second angle Dab when the foot lever 100 is in the rest position. The third angle RAa is 90 degrees or more. The fourth angle RAb is less than 90 degrees.

Figure 24:
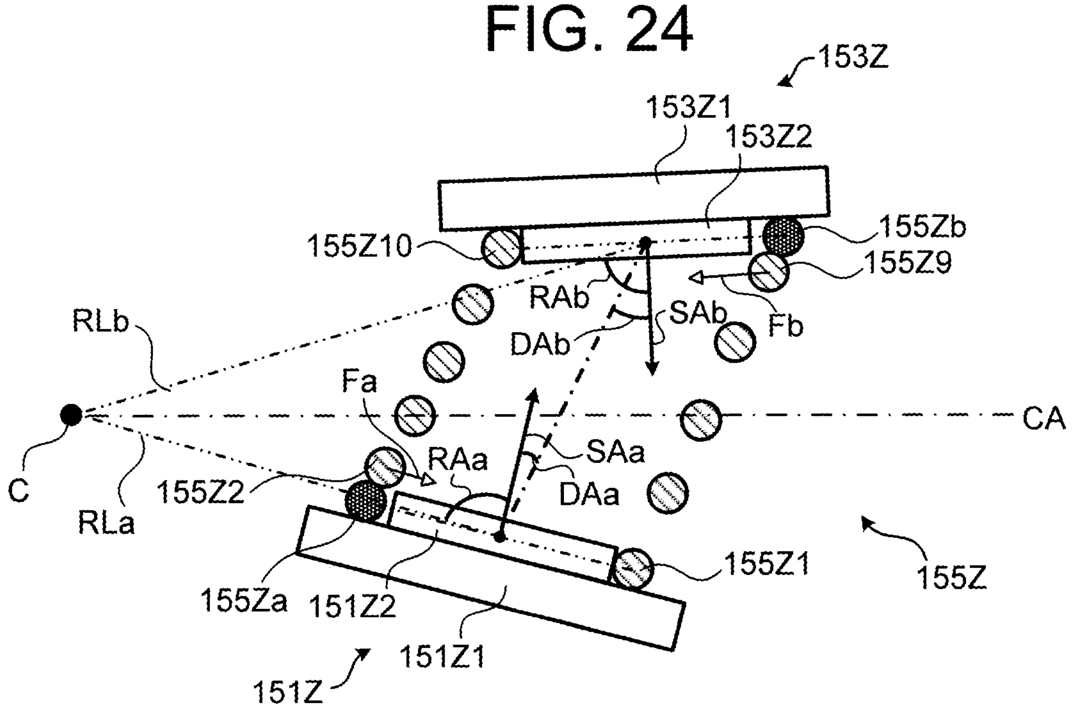
FIG. 24 is a diagram showing a shape (rest position) of a spring according to a comparison example 1.
Figure 25:
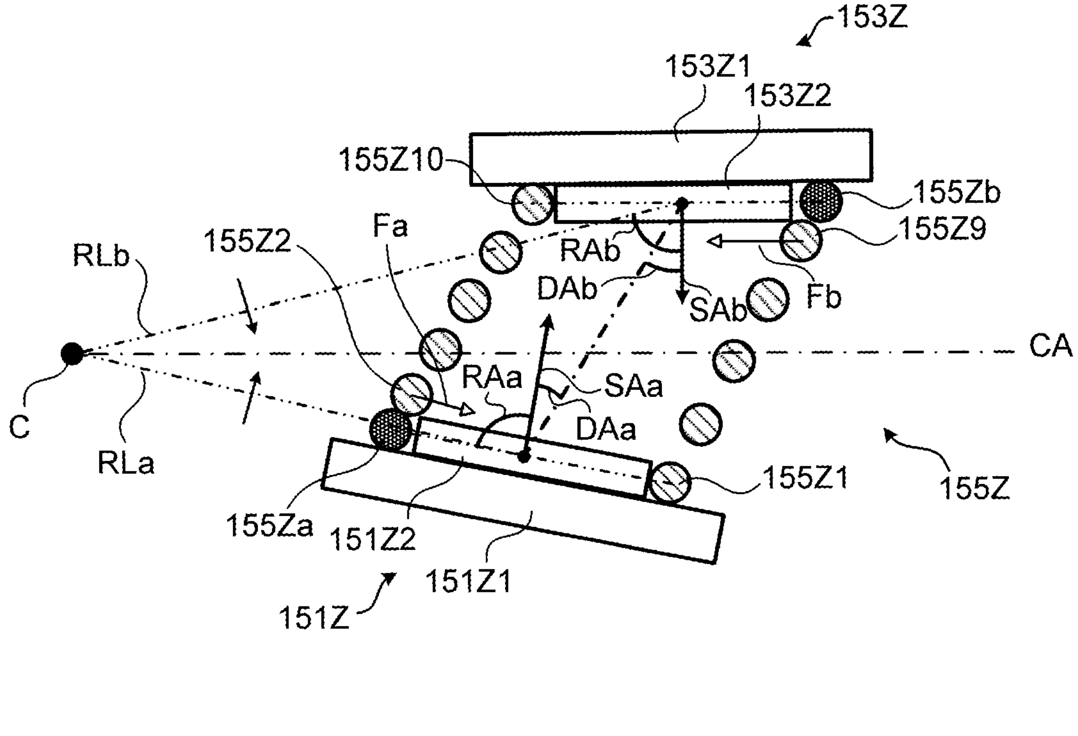
FIG. 25 is a diagram showing a shape (end position) of a spring according to the comparison example 1.

FIG. 24 is a diagram showing a shape of a spring (rest position) in Comparative Example 1. FIG. 25 is a diagram showing a shape of a spring (end position) in Comparative Example 1. In the examples of support members 151Z and 153Z and an elastic member 155Z shown in FIG. 24 and FIG. 25, the following situation occurs when the foot lever 100 moves from the rest position to the end position. The first angle DAa increases in all of the range of rotation of the foot lever 100. The second angle DAb increases in all of the range of rotation of the foot lever 100. The second angle DAb is greater than the first angle DAa when the foot lever 100 is in the rest position. The third angle RAa is less than 90 degrees. The fourth angle RAb is less than 90 degrees.

Figure 26:
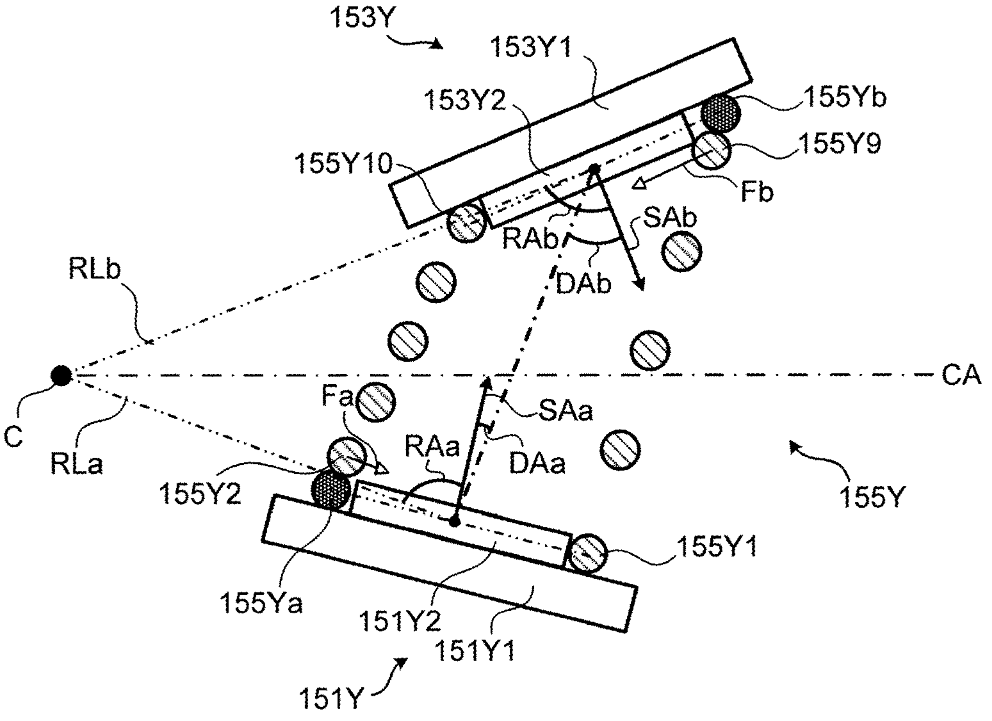
FIG. 26 is a diagram showing a shape (rest position) of a spring according to a comparison example 2.
Figure 27:
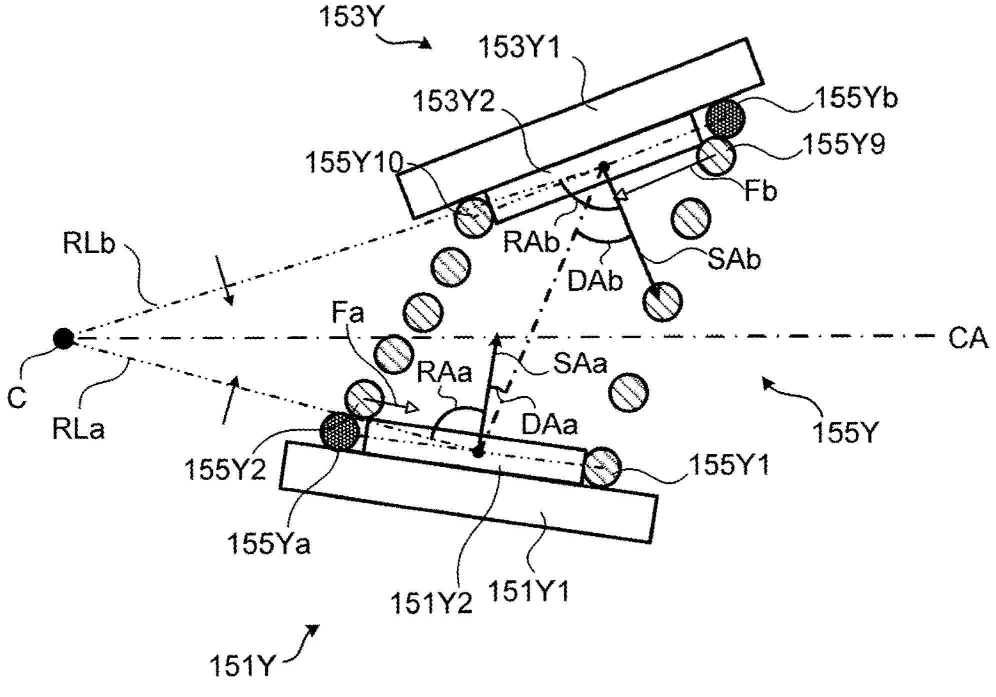
FIG. 27 is a diagram showing a shape (end position) of a spring according to the comparison example 2.

FIG. 26 is a diagram showing a shape of a spring (rest position) in Comparative Example 2. FIG. 27 is a diagram showing a shape of a spring (end position) in Comparative Example 2. In the examples of support members 151Y and 153Y and an elastic member 155Y shown in FIG. 26 and FIG. 27, the following situation occurs when the foot lever 100 moves from the rest position to the end position. The first angle DAa increases in all of the range of rotation of the foot lever 100. The second angle DAb increases in all of the range of rotation of the foot lever 100. The second angle DAb is greater than the first angle DAa when the foot lever 100 is in the rest position. The third angle RAa is less than 90 degrees. The fourth angle RAb is 90 degrees or more.

In Comparative Examples 1 and 2, since the first angle DAa and the second angle DAb increase when the foot lever 100 moves from the rest position to the end position, the force Fa and the force Fb also increase. As a result, the possibility of mechanical noise occurring increases. On the other hand, in the twelfth embodiment and the thirteenth embodiment, since at least one of the first angle DAa and the second angle DAb decreases when the foot lever 100 moves from the rest position to the end position, it is possible to suppress the occurrence of mechanical noise.

14th Embodiment

The mechanical noise described in the twelfth and thirteenth embodiments can be improved by using another configuration described below. The configuration will be described as a fourteenth embodiment. The improved configuration described below may be applied to a configuration satisfying the condition described in the twelfth and thirteenth embodiments, or may be applied to a configuration not satisfying the condition.

Figure 28:
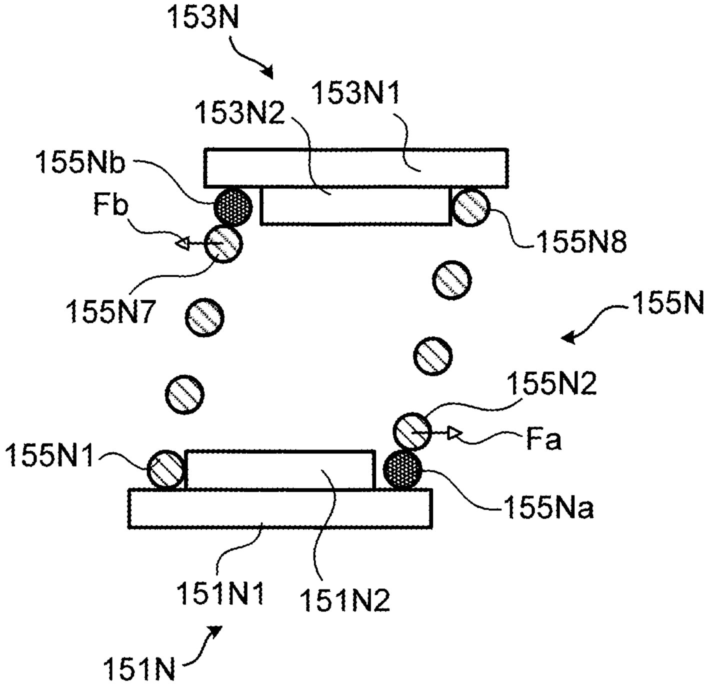
FIG. 28 is a diagram showing a positional relationship between a spring and a support member according to a fourteenth embodiment.

FIG. 28 is a diagram showing a positional relationship between the spring and the support member in the fourteenth embodiment. In FIG. 28, for the sake of clarity of explanation, the positional relationship of each configuration is schematically shown by being different from the actual positional relationship.

An elastic member 155N is a coil-shaped spring and has a winding connecting a first end portion 155Na and a second end portion 155Nb. In FIG. 28, the winding is shown by a cross-section passing through the central axis of the spring and includes the front-rear direction and the up-down direction. That is, the winding is connected in the order of the first end portion 155Na, winding cross-sections 155N1, 155N2, . . . 155N8, and the second end portion 155Nb. The elastic member 155N is a closed-end type spring. Therefore, a side surface in the first end portion 155Na contacts a side surface in the winding cross-section 155N2 adjacent to the first end portion 155Na. A side surface of the second end portion 155Nb contacts a side surface of the winding cross-section 155N7 adjacent to the second end portion 155Nb.

A support member 151N includes a base portion 151N1 and a protruding portion 151N2. A support member 153N includes a base portion 153N1 and a protruding portion 153N2. The base portions 151N1 and 153N1 are arranged to limit the extension of the elastic member 155N. The protruding portion 151N2 protrudes from the base portion 151N1 so as to be arranged in a space inside the spring. The protruding portion 153N2 protrudes from the base 153N1 so as to be arranged in the space inside the spring. The protruding portions 151N2 and 153N2 limit the lateral displacement of the spring by contacting the winding from the space inside the spring.

As shown in FIG. 28, in this example, the protruding portion 151N2 contacts a side surface of the winding cross-section 155N1 from an inner circumferential side of the spring. On the other hand, the protruding portion 151N2 does not contact both a side surface of the first end portion 155Na and a side surface of the winding cross-section 155N2. Since the side surface of the winding cross-section 155N2 does not contact the base portion 151N1, it can be said that the side surface does not contact the support member 151N.

In this example, the protruding portion 153N2 contacts a side surface of the winding cross-section 155N8 from the inner circumference side of the spring. On the other hand, the protruding portion 153N2 does not contact both the side surface of the second end portion 155Nb and the side surface of the winding cross-section 155N7. Since the side surface of the winding cross-section 155N7 does not contact the base 153N1, it can be said that the side surface does not contact the support member 153N.

Such a configuration is caused by the positional relationship between the support member 151N and the support member 153N. In the example shown in FIG. 28, the support member 151N is located on the left side of the diagram relatively with respect to the support member 153N. As a result, in the elastic member 155N, the side surface of the winding cross-section 155N1 receives a force pushing from the support member 151N to the left side, and the side surface of the winding cross-section 155N8 receives a force pushing from the support member 153N to the right side.

In this case, the winding cross-section 155N2 tries to move to the right side by receiving the force Fa pulled to the right side. On the other hand, the side surface of the winding cross-section 155N1 is supported by the support member 151N. Therefore, the winding cross-section 155N2 moves to the right side with respect to a distance (half winding) from the winding cross-section 155N1 to the winding cross-section 155N2. Similarly, the winding cross-section 155N7 receives the force Fb pulled to the left side and moves to the left side with reference to a distance (half winding) from the winding cross-section 155N8 to the winding cross-section 155N7.

Figure 29:
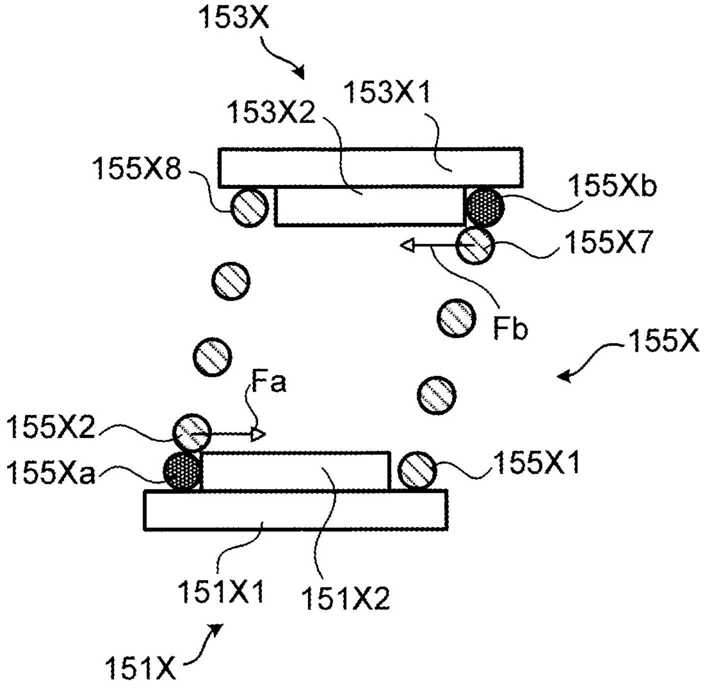
FIG. 29 is a diagram showing a positional relationship between a spring and a support member according to a comparison example 3.

FIG. 29 is a diagram showing a positional relationship between a spring and a support member according to Comparative Example 3. An elastic member 155X according to Comparative Example 3 is half-wound with respect to the elastic member 155N. As a result, a protruding portion 151X2 contacts a side surface of a first end portion 155Xa from the inner circumferential side of the spring. A protruding portion 153X2 contacts a side surface of a second end portion 155Xb from the inner circumferential side of the spring. On the other hand, the protruding portion 151X2 does not contact a side surface of a winding cross-section 155X1, and the protruding portion 153X2 does not contact a side surface of a winding cross-section 155X8.

Therefore, the winding cross-section 155X2 receives the force Fa pulled to the right side and moves to the right side with reference to a distance (one winding) from the first end portion 155Xa to the winding cross-section 155X2. Similarly, a winding cross-section 155X7 receives the force Fb pulled to the left side and moves to the left side with reference to a distance (one winding) from the second end portion 155Xb to the winding cross-section 155X7.

Since the amount of movement of the winding cross-section 155X2 and the winding cross-section 155X7 is based on one winding, the amount of movement is larger than the amount of movement of the winding cross-section 155N2 and the winding cross-section 155N7 based on the half winding. In other words, as shown in the fourteenth embodiment, the amount of movement of the winding cross-section 155N2 with respect to a predetermined force can be reduced by contacting the protruding portion 151N2 at any position (in this case, the winding cross-section 155N1) between the first end portion 155Na and the winding cross-sectional area 155N2. As a result, according to the fourteenth embodiment, it is possible to suppress the occurrence of mechanical noise more than in Comparative Example 3.

Fifteenth Embodiment

In the fourteenth embodiment, the protruding portions 151N2 and 153N2 are arranged inside the spring, but may be arranged outside as long as lateral displacement of the spring can be suppressed. In a fifteenth embodiment, an example in which the protruding portion is arranged on the outside of the spring will be described.

Figure 30:
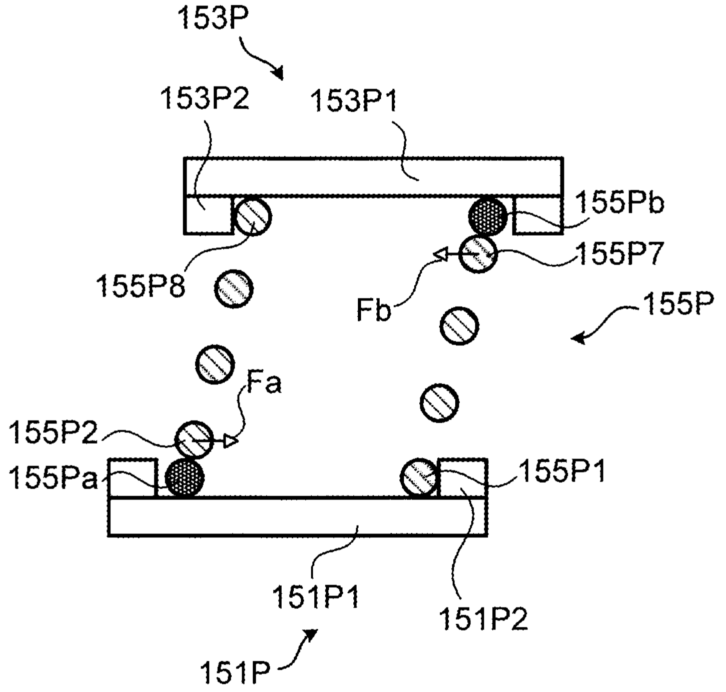
FIG. 30 is a diagram showing a positional relationship between a spring and a support member according to a fifteenth embodiment.

FIG. 30 is a diagram showing a positional relationship between the spring and the support member according to the fifteenth embodiment. An elastic member 155P is similar to the elastic member 155N. A support member 151P includes a base portion 151P1 and a protruding portion 151P2. A support member 153P includes a base portion 153P1 and a protruding portion 153P2. The base portions 151P1 and 153P1 are arranged to limit the extension of the elastic member 155P. The protruding portion 151P2 protrudes from the base portion 151P1 so as to surround the outside of the spring. The protruding portion 153P2 protrudes from the base portion 153P1 so as to surround the outside of the spring. The protruding portions 151P2 and 153P2 limit the lateral displacement of the spring by contacting the winding from the outside of the spring.

As shown in FIG. 30, in this example, the protruding portion 151P2 contacts a side surface of the winding cross-section 155P1 from the outer circumferential side of the spring. On the other hand, the protruding portion 151P2 does not contact both a side surface of a first end portion 155Pa and a side surface of a winding cross-section 155P2. That is, the protruding portion 151P2 does not need to support the spring from the first end portion 155Pa side (left side in FIG. 30) of the winding. Therefore, the protruding portion 151P2 may not have a shape surrounding the outside of the spring, but may have a shape arranged at least at a position contacting the side surface of the winding cross-section 155P1 as described above. Since the side surface of the winding cross-section 155P2 does not contact the base portion 151P1, it can be said that the side surface does not contact the support member 151P.

In this example, the protruding portion 153P2 contacts a side surface of the winding cross-section 155P8 from the outer circumferential side of the spring. On the other hand, the protruding portion 153P2 does not contact both a side surface of a second end portion 155Pb and a side surface of a winding cross-section 155P7. That is, the protruding portion 153P2 does not need to support the spring from a first end portion 155Pb side of the winding (right side in FIG. 30). Therefore, the protruding portion 153P2 may not have a shape surrounding the outside of the spring, but may have a shape arranged at least at a position contacting the side surface of the winding cross-section 155P8 as described above. Since the side surface of the winding cross-section 155P7 does not contact the base portion 153P1, it can be said that the side surface does not contact the support member 153P.

Such a configuration is caused by the positional relationship between the support member 151P and the support member 153P. In the example shown in FIG. 30, the support member 151P is located on the left side of the diagram relatively with respect to the support member 153P. As a result, in the elastic member 155P, the side surface of the winding cross-section 155P1 receives a force pushing from the support member 151P to the left side, and the side surface of the winding cross-section 155P8 receives a force pushing from the support member 153P to the right side.

In this case, the winding cross-section 155P2 tries to move to the right side by receiving the force Fa pulled to the right side. On the other hand, the side surface of the winding cross-section 155P1 is supported by the support member 151P. Therefore, the winding cross-section 155P2 moves to the right side with reference to the distance (half winding) from the winding cross-section 155P1 to the winding cross-section 155P2. Similarly, the winding cross-section 155P7 receives the force Fb pulled to the left side and moves to the left side with reference to a distance (half winding) from the winding cross-section 155P8 to the winding cross-section 155P7.

Figure 31:
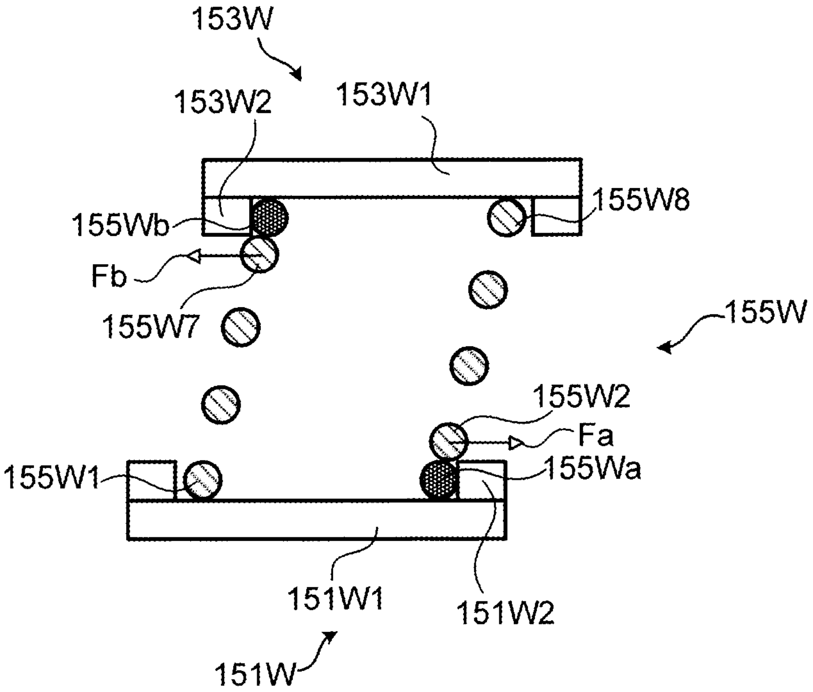
FIG. 31 is a diagram showing a positional relationship between a spring and a support member according to a comparison example 4.

FIG. 31 is a diagram showing a positional relationship between a spring and a support member according to Comparative Example 4. An elastic member 155W according to Comparative Example 4 is half-wound with respect to the elastic member 155P. As a result, a protruding portion 151W2 contacts a side surface of a first end portion 155Wa from the outer circumferential side of the spring. A protruding portion 153W2 contacts a side surface of a second end portion 155Wb from the outer circumferential side of the spring. On the other hand, the protruding portion 151W2 does not contact a side surface of a winding cross-section 155W1, and the protruding portion 153W2 does not contact a side surface of a winding cross-section 155W8.

Therefore, the winding cross-section 155W2 moves to the right with reference to the distance (one winding) from the first end portion 155Wa to the winding cross-section 155W2. Similarly, the winding cross-section 155W7 moves to the left side with reference to a distance (one winding) from the second end portion 155Wb to the winding cross-section 155W7.

Since the amount of movement of the winding cross-section 155W2 and the winding cross-section 155W7 is based on one winding, the amount of movement is larger than the amount of movement of the winding cross-section 155P2 and the winding cross-section 155P7 based on the half winding. In other words, as shown in the fifteenth embodiment, the amount of movement of the winding cross-section 155P2 with respect to a predetermined force can be reduced by contacting the protruding portion 151P2 at any position (in this case, the winding cross-section 155P1) between the first end portion 155Pa and the winding cross-sectional area 155P2. As a result, according to the fifteenth embodiment, it is possible to suppress the occurrence of mechanical noise more than in Comparative Example 4.

Sixteenth Embodiment

In Comparative Example 3 described above, it is also possible to suppress the occurrence of mechanical noise by increasing the height of the protruding portion. In a sixteenth embodiment, an example in which the heights of the protruding portions 151X2 and 153X2 in Comparative Example 3 described above are increased will be described. Similarly, the heights of the protruding portions may be increased in the twelfth to fifteenth embodiments and in the fourth comparative example described below.

Figure 32:
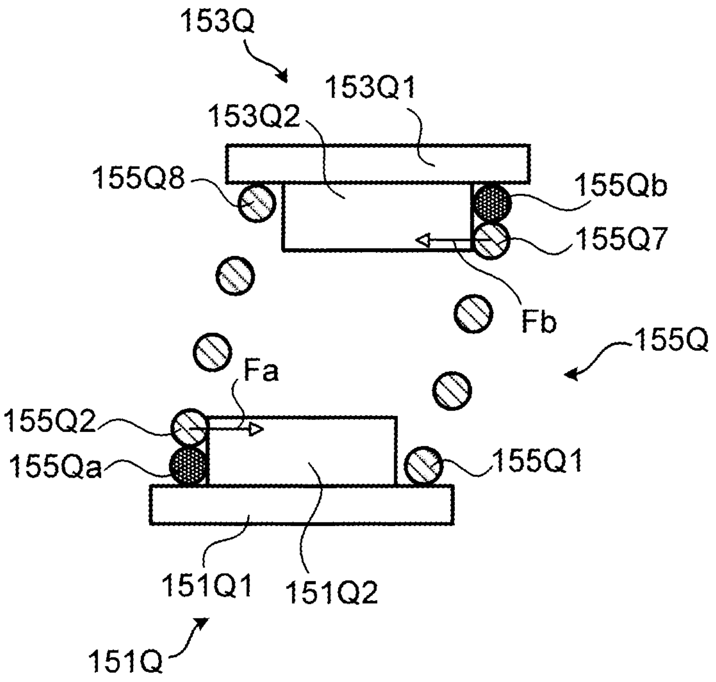
FIG. 32 is a diagram showing a positional relationship between a spring and a support member according to a sixteenth embodiment.

FIG. 32 is a diagram showing a positional relationship between a spring and a support member in the sixteenth embodiment. An elastic member 155Q and base portions 151Q1 and 153Q1 in the sixteenth embodiment have the same configuration as in Comparative Example 3. A protruding portion 151Q2 contacts a side surface of a first end portion 155Qa from the inner circumferential side of the spring. The protruding portion 151Q2 further protrudes from the base portion 151Q1 to a height at which it can also contact a side surface of a winding cross-section 155Q2. In this example, the protruding portion 151Q2 contacts the side surface of the winding cross-section 155Q2 in all of the range of rotation of the foot lever 100, but may not contact the side surface of the winding cross-section 155Q2 in part of the range of rotation.

A protruding portion 153Q2 contacts a side surface of a second end portion 155Qb from the inner circumferential side of the spring. In this example, the protruding portion 153Q2 also protrudes from the base portion 153Q1 to a height at which it can also contact a side surface of a winding cross-section 155Q7. In this example, the protruding portion 153Q2 contacts the side surface of the winding cross-section 155Q7 in all of the range of rotation of the foot lever 100, but may not contact the side surface of the winding cross-section 155Q7 in part of the range of rotation.

As a result, even if the winding cross-section 155Q2 is subjected to the force Fa that is pulled to the right, the movement is suppressed by the protruding portion 151Q2. Similarly, even if the winding cross-section 155Q7 is subjected to the force Fb that is pulled to the left, the movement is suppressed by the protruding portion 153Q2. Therefore, according to the sixteenth embodiment, it is possible to suppress the occurrence of mechanical noise.

Seventeenth Embodiment

In Comparative Example 4 described above, it is also possible to suppress the occurrence of mechanical noise by increasing the height of the protruding portion. In a seventeenth embodiment, an example in which the heights of the protruding portions 151W2 and 153W2 in Comparative Example 4 described above are increased will be described.

Figure 33:
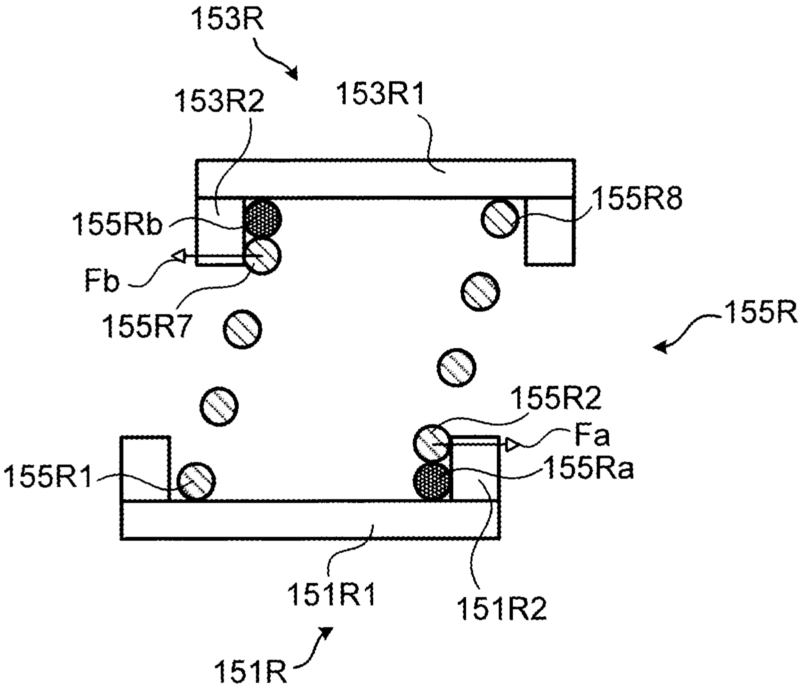
FIG. 33 is a diagram showing a positional relationship between a spring and a support member according to a seventeenth embodiment.

FIG. 33 is a diagram showing a positional relationship between a spring and a support member according to the seventeenth embodiment. An elastic member 155R and base portions 151R1 and 153R1 according to the seventeenth embodiment have the same configuration as in Comparative Example 4. A protruding portion 151R2 contacts a side surface of a first end portion 155Ra from the inner circumferential side of the spring. The protruding portion 151R2 further protrudes from the base portion 151R1 to a height at which it can also contact a side surface of a winding cross-section 155R2. In this example, the protruding portion 151R2 contacts the side surface of the winding cross-section 155R2 in all of the range of rotation of the foot lever 100, but may not contact the side surface of the winding cross-section 155R2 in part of the range of rotation.

A protruding portion 153R2 contacts the side surface of the second end portion 155Rb from the inner circumferential side of the spring. In this example, the protruding portion 153R2 also protrudes from the base portion 153R1 to a height at which it can also contact a side surface of a winding cross-section 155R7. In this example, the protruding portion 153R2 contacts the side surface of the winding cross-section 155R7 in all of the range of rotation of the foot lever 100, but may not contact the side surface of the winding cross-section 155R7 in part of the range of rotation.

As a result, even if the winding cross-section 155R2 is subjected to the force Fa that is pulled to the right side, the movement is suppressed by the protruding portion 151R2. Similarly, even if the winding cross-section 155R7 is subjected to the force Fb that is pulled to the left side, the movement is suppressed by the protruding portion 153R2. Therefore, according to the seventeenth embodiment, it is possible to suppress the occurrence of mechanical noise.

In the twelfth to seventeenth embodiments described above, the positional relationship between the support members 151 and 153 and the elastic member 155 has been described. The configuration in each embodiment corresponding to the support member 151 is fixed to the foot lever 100, and the configuration in each embodiment corresponding to the support member 153 is fixed to the case 190, but the relationship may be reversed. That is, the configuration in each embodiment corresponding to the support member 151 may be fixed to the case 190, and the configuration in each embodiment corresponding to the support member 153 may be fixed to the foot lever 100.

[Modifications]

The present disclosure is not limited to the above-described embodiments, and includes various other modifications. For example, the above-described embodiments have been described in detail for the purpose of illustrating the present disclosure in an easy-to-understand manner, and are not necessarily limited to those having all the described configurations. Other configurations may be added, deleted, or substituted for some of the configurations of the embodiments. Hereinafter, although a modified example of the first embodiment will be described, other embodiments can also be applied as a modified example. The above-described embodiments and the modifications described below can be applied in combination with each other as long as no contradiction is caused.

(1) The contact sensor 173 may not be arranged. In this case, the protruding portion 161 in the reaction force adding member 165 may not be present. Further, the reaction force adding member 165 may not be arranged.

(2) At least one of the lower stopper 181 and the upper stopper 183 may be arranged in the front direction F with respect to the center of rotation C. In this case, the upper stopper 183 is arranged in the bottom direction B of the foot lever 100, and the lower stopper 181 is arranged in the upper direction U of the foot lever 100.

(3) Other sensors, such as a volumetric sensor, may be used as the stroke sensor 171 rather than an optical sensor. The stroke sensor 171 is not limited to being arranged in the upper space US, and may be arranged in the lower space LS or may be arranged in the left-right direction of the foot lever 100. The stroke sensor 171 is not limited to detecting the position of the first area 100*r*, and may detect the position of the second area 100*f* or may detect the amount of rotation of the shaft 115.

(4) At least two of the foot levers 100-1, 100-2, and 100-3 may have different shapes in at least one of the following points:

(a) Radius of the shaft 115 (radius of curvature DD)

(b) The magnitude of the force applied by the elastic member 155 to the first area 100*r*

(c) The magnitude of the reaction force by the reaction force adding member 165

(d) The presence or absence of the reaction force adding member 165

An example of the case (a) will be described. The radius of curvature DD of the foot levers 100-1, 100-2, and 100-3 are defined as a first distance DD1, a second distance DD2, and a third distance DD3, respectively. The first distance DD1 may be different from at least one of the second distance DD2 and the third distance DD3. In order to emphasize the magnitude of the reaction force of the shift pedal, the third distance DD3 may be larger than both the first distance DD1 and the second distance DD2.

What is claimed is:

1. A pedal unit for an electronic musical instrument, the pedal unit comprising:
a first foot lever;
a first shaft serving as a first center of rotation of the first foot lever; and
a first bearing rotatably supporting the first shaft,
wherein the first bearing includes:
a first member arranged in contact with the first shaft; and
a second member formed of a material different from the first member and supporting the first member from a side opposite the first shaft,
wherein the first member and the second member are fixed in a sliding direction of the first shaft, and
wherein the first member is sandwiched between the first shaft and the second member.

2. The pedal unit according to claim 1, further comprising an elastic member configured to increase a force between the first shaft and the first bearing as a force for rotating the first foot lever is applied to the first foot lever.

3. The pedal unit according to claim 1, further comprising:
a second foot lever;
a second shaft serving as a second center of rotation of the second foot lever; and
a second bearing rotatably supporting the second shaft,
wherein a first distance from the first center of rotation to a first position where the first shaft and the first bearing contact each other for the first foot lever is different from a second distance from the second center of rotation to a second position where the second shaft and the second bearing contact each other for the second foot lever.

4. The pedal unit according to claim 3, further comprising:
a third foot lever;
a third shaft serving as a third center of rotation of the third foot lever; and
a third bearing rotatably supporting the third shaft,
wherein the first foot lever, the second foot lever, and the third foot lever are arranged in order from right to left as viewed from a player's perspective, and
wherein a third distance from the third center of rotation to a third position where the third shaft and the third bearing contact each other for the third foot lever is greater than either the first distance or the second distance.

5. The pedal unit according to claim 1, wherein:
the first shaft and the first bearing are in contact with each other in at least a first area and a second area,
the first and second areas are arranged spaced apart from each other, and
a portion of the first shaft and a portion of the first bearing between the first and second areas are separated from each other.

6. The pedal unit according to claim 5, wherein:
a first position is between the first area and the second area and separated from both the first area and the second area,
a second position is between the first position and the first area,
a third position is between the first position and the second area, and
a first separation distance from the first shaft to the first bearing in the first position is shorter than a second separation distance from the first shaft to the first bearing in the second position and a third separation distance from the first shaft to the first bearing in the third position.

7. The pedal unit according to any of claim 1, wherein:
the first bearing comprises a pair of bearings, and
the first shaft is sandwiched between the pair of bearings, in a state where the pair of bearings are subjected to opposing forces in a direction approaching each other.

8. The pedal unit according to claim 7, wherein:
the first shaft is in contact with one of the pair of bearings at least in a first area and in a second area,
the first and second areas are arranged spaced apart from each other,
a portion of the first shaft and a portion of the one of the pair of bearings between the first and second areas are separated from each other,
the first shaft is in contact with the other of the pair of bearings at least in a third area and a fourth area,
the third and fourth areas are arranged spaced apart from each other, and
a portion of the first shaft and a portion of the other of the pair of bearings between the third and fourth areas are separated from each other.

9. An electronic keyboard device comprising:
the pedal unit according to claim 1, and
a keyboard unit including a plurality of keys, and
a sound source unit configured to generate a sound signal in response to an operation on any of the plurality of keys and an operation on the first foot lever in the pedal unit.

10. A pedal unit for an electronic musical instrument, the pedal unit comprising:
a first foot lever;
a first shaft serving as a first center of rotation of the first foot lever;
a first bearing rotatably supporting the first shaft; and
a second bearing rotatably supporting the first shaft, which is arranged under the first foot lever,
wherein the first shaft includes an interlocking portion that extends to an outer area outside a width of the first foot lever, the width extending parallel with a longitudinal direction of the first shaft, and
wherein the first bearing includes a portion sliding with the first shaft in the outer area as the first foot lever is rotated.

11. The pedal unit according to claim 10, further comprising an elastic member configured to increase a force between the first shaft and the first bearing as a force for rotating the first foot lever is applied to the first foot lever.

12. The pedal unit according to claim 10, further comprising:
a second foot lever;
a second shaft serving as a second center of rotation of the second foot lever; and
a third bearing rotatably supporting the second shaft,
wherein a first distance from the first center of rotation to a first position where the first shaft and the first bearing contact each other for the first foot lever is different from a second distance from the second center of rotation to a second position where the second shaft and the third bearing contact each other for the second foot lever.

13. The pedal unit according to claim 12, further comprising:
a third foot lever;
a third shaft serving as a third center of rotation of the third foot lever; and a fourth bearing rotatably supporting the third shaft, wherein the first foot lever, the second foot lever, and the third foot lever are arranged in order from right to left as viewed from a player's perspective, and wherein a third distance from the third center of rotation to a third position where the third shaft and the fourth bearing contact each other for the third foot lever is greater than either the first distance or the second distance.

14. The pedal unit according to claim 10, wherein:

the first shaft and the first bearing are in contact with each other in at least a first area and a second area, the first and second areas are arranged spaced apart from each other; and a portion of the first shaft and a portion of the first bearing between the first and second areas are separated from each other.

15. The pedal unit according to claim 14, wherein:

a first position is between the first area and the second area and separated from both the first area and the second area, a second position is between the first position and the first area, a third position is between the first position and the second area, and a first separation distance from the first shaft to the first bearing in the first position is shorter than a second separation distance from the first shaft to the first bearing in the second position and a third separation distance from the first shaft to the first bearing in the third position.

16. The pedal unit according to any of claim 10, wherein:

the first bearing comprises a pair of bearings, and the first shaft is sandwiched between the pair of bearings, in a state where the pair of bearings are subjected to opposing forces in a direction approaching each other.

17. The pedal unit according to claim 16, wherein:

the first shaft is in contact with one of the pair of bearings at least in a first area and in a second area, the first and second areas are arranged spaced apart from each other, a portion of the first shaft and a portion of the one of the pair of bearings between the first and second areas are separated from each other, the first shaft is in contact with the other of the pair of bearings at least in a third area and a fourth area, the third and fourth areas are arranged spaced apart from each other, and a portion of the first shaft and a portion of the other of the pair of bearings between the third and fourth areas are separated from each other.

18. A pedal unit for an electronic musical instrument, the pedal unit comprising:

a first foot lever;

a first shaft serving as a first center of rotation of the first foot lever; and a first bearing rotatably supporting the first shaft, wherein the first shaft and the first bearing are in contact at least in a first area and a second area, wherein the first and second areas are arranged spaced apart from each other; and wherein a portion of the first shaft and a portion of the first bearing between the first and second areas are separated from each other.

19. The pedal unit according to claim 18, further comprising an elastic member configured to increase a force between the first shaft and the first bearing as a force for rotating the first foot lever is applied to the first foot lever.

20. The pedal unit according to claim 18, further comprising:

a second foot lever;

a second shaft serving as a second center of rotation of the second foot lever; and a second bearing rotatably supporting the second shaft, wherein a first distance from the first center of rotation to a first position where the first shaft and the first bearing contact each other is different from a second distance from the second center of rotation to a second position where the second shaft and the second bearing contact each other for the second foot lever.

21. The pedal unit according to claim 20, further comprising:

a third foot lever;

a third shaft serving as a third center of rotation of the third foot lever; and a third bearing rotatably supporting the third shaft, wherein the first foot lever, the second foot lever, and the third foot lever are arranged in order from right to left as viewed from a player's perspective, and wherein a third distance from the third center of rotation to a third position where the third shaft and the third bearing contact each other for the third foot lever is greater than either the first distance or the second distance.

22. The pedal unit according to claim 18, wherein:

a first position is between the first area and the second area and separated from both the first area and the second area, a second position is between the first position and the first area, a third position is between the first position and the second area, and a first separation distance from the first shaft to the first bearing in the first position is shorter than a second separation distance from the first shaft to the first bearing in the second position and a third separation distance from the first shaft to the first bearing in the third position.

23. The pedal unit according to any of claim 18, wherein:

the first bearing comprises a pair of bearings, and the first shaft is sandwiched between the pair of bearings, in a state where the pair of bearings are subjected to opposing forces in a direction approaching each other.

24. The pedal unit according to claim 23, wherein:

the first shaft is in contact with one of the pair of bearings at least in the first area and in the second area, a portion of the first shaft and a portion of the one of the pair of bearings between the first and second areas are separated from each other, the first shaft is in contact with the other of the pair of bearings at least in a third area and a fourth area, the third and fourth areas are arranged spaced apart from each other, and a portion of the first shaft and a portion of the other of the pair of bearings between the third and fourth areas are separated from each other.

* * * * *